US008923619B2

(12) United States Patent
Madhani et al.

(10) Patent No.: US 8,923,619 B2
(45) Date of Patent: Dec. 30, 2014

(54) METHOD AND SYSTEM FOR CREATING OPTIMIZED IMAGES FOR DATA IDENTIFICATION AND EXTRACTION

(71) Applicant: Intuit Inc., Mountain View, CA (US)

(72) Inventors: Sunil Madhani, Mountain View, CA (US); Anu Sreepathy, Bangalore (IN); Samir Kakkar, Bangalore (IN)

(73) Assignee: Intuit Inc., Mountain View, CA (US)

( * ) Notice: Subject to any disclaimer, the term of this patent is extended or adjusted under 35 U.S.C. 154(b) by 49 days.

(21) Appl. No.: 13/915,455

(22) Filed: Jun. 11, 2013

(65) Prior Publication Data

US 2014/0294304 A1    Oct. 2, 2014

(30) Foreign Application Priority Data

Mar. 28, 2013   (IN) .............................. 352/KOL/2013

(51) Int. Cl.
*G06K 9/18*   (2006.01)
(52) U.S. Cl.
CPC ........................................ *G06K 9/18* (2013.01)
USPC .......................................................... 382/182
(58) Field of Classification Search
None
See application file for complete search history.

(56) References Cited

U.S. PATENT DOCUMENTS

| | | |
|---|---|---|
| 5,502,576 A | 3/1996 | Ramsay et al. |
| 5,912,974 A | 6/1999 | Holloway et al. |
| 2004/0080661 A1 | 4/2004 | Afsenius et al. |
| 2005/0289182 A1 | 12/2005 | Pandian et al. |
| 2007/0263091 A1 | 11/2007 | Kato et al. |
| 2011/0091092 A1 | 4/2011 | Nepomniachtchi et al. |
| 2011/0255791 A1 | 10/2011 | Abdo et al. |

FOREIGN PATENT DOCUMENTS

WO    WO 96/39682    12/1996

OTHER PUBLICATIONS

Kakkar et al., "Method and System for Data Identification and Extraction Using Pictorial Representations in a Source Document," U.S. Appl. No. 13/949,564, filed Jul. 24, 2013.
Saluja et al., "Text Extraction and Non Text Removal from Colored Images," *International Journal of Computer Applications* (0975-8887), vol. 44, No. 22, Apr. 2012, pp. 13-19.

*Primary Examiner* — Stephen R Koziol
*Assistant Examiner* — Amandeep Saini
(74) *Attorney, Agent, or Firm* — Hawley Troxell Ennis & Hawley LLP; Philip McKay

(57) ABSTRACT

A viewfinder screen display is generated and positioned such that a source document is displayed in the viewfinder screen display. Source document image blocks corresponding to different portions of the source document are then defined. For each source document image block, the image capture parameter of an image capture device is set to an optimized image capture parameter setting for the source document image block. The image capture device then captures an image block optimized image of the source document optimized for the source document image block. The optimized source document image blocks are then extracted from each image block optimized image of the source document. The extracted optimized source document image blocks are then aggregated and used to construct an image capture parameter optimized image of the source document.

52 Claims, 9 Drawing Sheets

Figures 4B, 4C, 4D, 5:
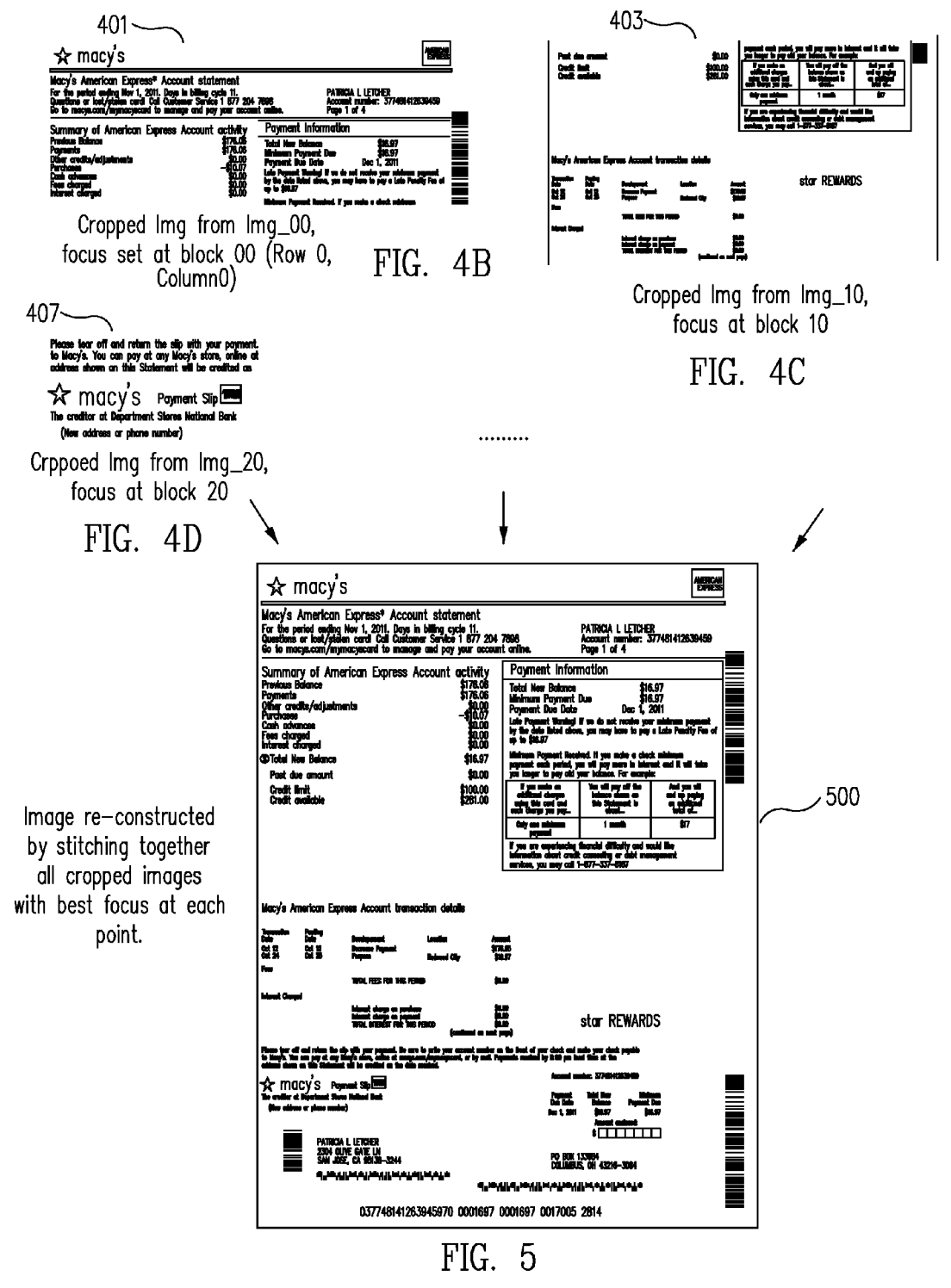

401

Cropped Img from Img_00,
focus set at block 00 (Row 0,
Column0)

Cropped Img from Img_10,
focus at block 10

Crppoed Img from Img_20,
focus at block 20

Image re-constructed
by stitching together
all cropped images
with best focus at each
point.

METHOD AND SYSTEM FOR CREATING OPTIMIZED IMAGES FOR DATA IDENTIFICATION AND EXTRACTION

BACKGROUND

The widespread availability of optical image capture devices, such as cameras, implemented on, or with, computing systems, such as mobile devices and smart phones, has resulted in a significant number applications and systems that rely on the ability to extract data from images of hard copy documents in order to obtain various types of information.

For instance, many currently available financial management systems, financial transaction management systems, tax-preparation systems, and various other data management systems, obtain data from optical images of source documents processed using Optical Character Recognition (OCR) systems, or similar data extraction technologies.

While the use of optical images and data extraction technology provides some capability to obtain information with minimal user input, there are several issues associated with these methods. One long-standing problem associated with using optical images and data extraction technology to obtain data is that the optical image of the source document must be of sufficient quality to allow the data extraction technology to identify and extract the individual characters and symbols represented in the optical image of the source document.

The problem arises because many source documents are of significant size and, therefore, in order to capture an optical image of the entire source document, the camera, or other optical image capture device, must be positioned a relatively significant distance away from the source document; often 10 inches or more away from the source document. As a result, when the camera, or other optical image capture device, automatically adjusts various image capture parameters, such as the focus and exposure settings, to capture the source document image, those settings are only optimized, and effective, for a portion of the source document, such as the middle portion of the source document. However, the data desired from the source document is often distributed throughout the source document, including in the portions of the source document where the image capture parameters, such as the focus and exposure, are not optimized.

As a result, currently, significant portions of the source document information are often not clearly captured in the source document image and therefore cannot be identified and processed using OCR, or other data extraction technologies. Consequently, in many cases, an individual attempting to provide an optical image of a source document is often forced to capture multiple images of the source document, and provide the multiple images of the source document to the data extraction technology before the source document data is obtained. This is a frustrating and time-consuming process for the user and often largely negates the potential advantages of using optical images and data extraction technology.

In addition, the process of transferring multiple images of the source document to a data extraction technology engine, such as an OCR capability implemented by a remote computing system/server, creates several problems in and of itself. For instance, the bandwidth required to transfer multiple images of the source document to a data extraction engine server is significant, and often an issue. In addition, the processor cycles required to transfer and process multiple images of the source document is also often problematic. Finally, the transfer of multiple images of the source document can represent a security risk. This is particularly problematic when the source document is a sensitive document such as a bill, invoice, tax document, etc.

What is needed is a method system for accurately, efficiently, and reliably providing an optimized optical image of a source document to a data extraction engine, such as OCR capability, without requiring the transfer of multiple images of the source document or requiring significant user input or action.

SUMMARY

In accordance with one embodiment, a system and method for creating optimized images for data identification and extraction includes generating a viewfinder screen display on a display screen of a display device. The viewfinder screen display is then positioned such that a source document is displayed in the viewfinder screen display.

In one embodiment, an image capture parameter is defined. In various embodiments, the image capture parameter is one or more of, but not limited to, the focus setting, or focal point; the exposure setting; or any other image capture parameter that determines an image capture setting on an image capture device, as discussed herein, and/or as known in the art at the time of filing, and/or as developed after the time of filing.

In one embodiment, two or more source document image blocks corresponding to different portions and/or regions of the source document are defined. In one embodiment, for each source document image block, the image capture parameter of an image capture device is set to an optimized image capture parameter setting for the source document image block.

In one embodiment, the image capture device then captures an image block optimized image of the source document optimized for the source document image block. In one embodiment, all of the image block optimized images of the source document are aggregated and for each image block optimized image of the source document, the image data representing the optimized source document image block in the image block optimized image of the source document is extracted.

In one embodiment, the extracted image data representing the optimized image blocks of the source document are then aggregated and used to reconstruct an image capture parameter optimized image of the source document. The image capture parameter optimized image of the source document is then provided to a data extraction engine for processing.

BRIEF DESCRIPTION OF THE DRAWINGS

FIG. 4B shows extracted image data representing the optimized image block 401 of FIG. 4A, in accordance with one embodiment;

FIG. 4C shows extracted image data representing the optimized image block 403 of FIG. 4A, in accordance with one embodiment;

FIG. 4D shows extracted image data representing the optimized image block 407 of FIG. 4A, in accordance with one embodiment;

FIG. 5 shows a focus optimized image of the source document of FIGS. 4A to 4D, generated in accordance with one embodiment.

Figure 1:
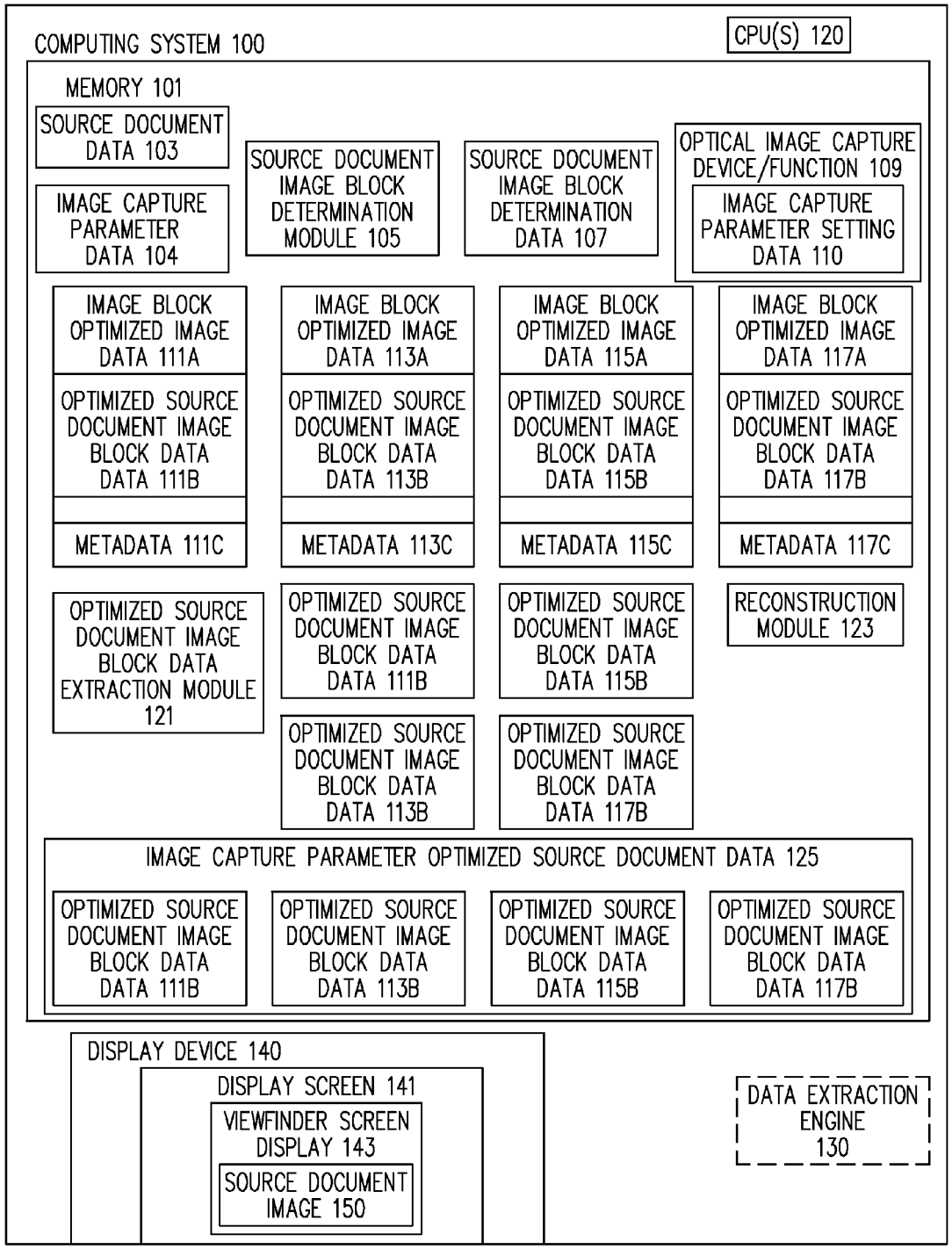
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "source data" includes data representing characters, symbols, text, visual images, and any other information or data obtained from a source document, or an image of a source document.

Herein the terms "image block optimized image" and "image block optimized image of the source document" are used interchangeably and include an image of an entire source document taken with one or more image capture parameters set to optimally capture the image of a defined image block, or region, of the source document, i.e., an "optimized source document image block".

Herein, the terms "image block optimized image data" and "image block optimized image of the source document data" are used interchangeably and include data representing the "image block optimized image" and "image block optimized image of the source document."

Herein the term "optimized source document image block" includes the image of a defined image block, or region, of a source document that is, or was, a part of an image block optimized image of the source document obtained with one or more image capture parameters set to optimally capture an image of the defined image block, or region, of the source document.

Herein the terms "optimized source document image block data" and "extracted image data representing the optimized image block" includes data representing the "optimized source document image block."

Herein the terms "metadata" and "meta-data" are used interchangeably and include data used to identify, describe, correlate, or tag, other data, such as, but not limited to, data used to identify, describe, correlate, or tag, "optimized source document image block data" or "image block optimized image data."

Herein the terms "image capture parameter optimized reconstruction of the source document" and "image capture parameter optimized source document" are used interchangeable and include a reconstructed image of a source document generated by aggregating two or more optimized source document image blocks associated with the source image obtained from two or more image block optimized image of the source document.

Herein, the terms "image capture parameter optimized reconstruction of the source document data" and "image capture parameter optimized source document data" includes data representing the "image capture parameter optimized reconstruction of the source document" and "image capture parameter optimized source document."

In one embodiment, a process for creating optimized images for data identification and extraction includes one or more applications, such as software packages, modules, or systems, implemented on one or more computing systems through which a viewfinder screen display is generated. In one embodiment, the viewfinder screen display is displayed on the display screen of the display device associated with a computing system. In one embodiment, the computing system also includes an image capture device function.

In one embodiment, the computing system is a mobile computing system such as a smart phone, or other mobile device, including an integrated camera function. However, as used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment, when a user desires to capture an image of a source document for data extraction, the user activates an image capture function on the computing system. In one embodiment, activation of the image capture function causes the viewfinder screen display to be displayed on the display screen of the display device of the computing system.

In one embodiment, the user is then prompted to position the viewfinder screen display, and/or the computing device, such that a source document is displayed within the viewfinder screen display.

In various embodiments, the source document can be any hard copy, or printed, document such as, but not limited to, a bill, an invoice, a bank statement, a credit card statement, a document associated with a financial transaction, a tax document, a warranty document, or any other hard copy or printed document, as discussed herein, and/or as known in the art at the time of filing, and/or as developed after the time of filing.

In one embodiment, one or more image capture parameters are defined. In various embodiments, the image capture parameters can be, but are not limited to, one or more of, a focus setting for the image capture device, such as a camera function, associated with the computing system; an exposure setting for the image capture device, such as a camera function, associated with the computing system; and or any other image capture parameter that can be adjusted or set on an image capture device, such as a camera function, as discussed herein, and/or as known in the art at the time of filing, and/or as developed after the time of filing.

In one embodiment, the image of the source document, as displayed in the viewfinder screen display, is partitioned into two or more source document image blocks, or regions.

In one embodiment, the one or more source document image blocks are determined by defining two or more portions or regions of the viewfinder screen display that correspond to two or more portions of the source document such that the image of the source document, as displayed in the viewfinder screen display, is divided into source document image blocks corresponding to the defined portions or regions of the viewfinder screen display.

In one embodiment, the one or more source document image blocks are determined by first determining the size of the source document, in one embodiment using edge detection technology, and then partitioning the image of the source document, as displayed in the viewfinder screen display, into source document image blocks or regions.

In various embodiments, the number of source document image blocks is determined based, at least in part, on the resolution of the image capture device, such as a camera function implemented on the computing system, that will be used to capture one or more images of the source document.

As specific example, in some embodiments, the number of source document image blocks is set at nine image blocks composed of a matrix or grid of three rows and three columns of image blocks. As another example, such as when the image capture device has a higher resolution, the number of source document image blocks is set at 16 source document image blocks arranged in a matrix or grid of four rows and four columns. In other embodiments, the number of source document image blocks is set at any number desired, and are arranged in any arrangements desired.

In one embodiment, the source document image blocks are defined such that the source document image blocks are distributed uniformly over the surface of the source document image, and are of the same size. In other embodiments, the source document image blocks are selected and sized so that portions of the source document that are known to be of more significance, i.e., that are known to contain more desired information, are partitioned by a greater number of the source document image blocks, and, in some cases, smaller sized source document image blocks, than those portions of the source document known to be of less significance.

In one embodiment, the determination of the number, size, and distribution, of source document image blocks is based on the type of source document and, in some cases, the source of the source document. For instance, it is known that most source documents that are credit card statements, or bills, have more information of interest in the bottom third of the source document than in the rest of the document. Consequently, when the source document is identified as a credit card statement, or a bill, the source document image blocks are defined such that more of the source document image blocks are directed to the bottom third of the source document then the rest of the source document.

In addition, it may be determined that a credit card statement from a specific given credit card provider includes the most critical information in the bottom third, and left half, of the source document. Consequently, in this specific illustrative example, when the source document is identified as a credit card statement from the specific given credit card provider, the source document image blocks are defined such that more of the source document image blocks are directed to the bottom third and left half of the source document than the rest of the source document.

In one embodiment, data regarding the type, and/or source, of a source document is provided by user input through the computing system. In one embodiment, data regarding the location of the most critical information in various types of source documents is stored in one or more databases as source document type data.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, for each defined source document image block, an image capture parameter adjustment location is defined that lies within the defined source document image block. For instance, in a case where the image capture parameter is the focus setting, for each defined source document image block a focus point is defined, such as the center of the respective source document image block. Likewise, in the case where the image capture parameter is the exposure setting, an exposure determination point is defined, such as the respective source document image block center.

In one embodiment, for each image capture parameter adjustment location, i.e., for each source document image block, an optimized image capture parameter setting is determined. In one embodiment, for each image capture parameter adjustment location, i.e., for each source document image block, a set of optimized image capture parameter settings is determined.

Then, for each source document image block, the image capture parameter setting on, or for, the image capture device, such as a camera function, is set to the optimized image capture parameter setting for that image capture parameter adjustment location and source document image block. An image block optimized image of the source document is then captured with the image capture parameter set to this optimized image capture parameter setting. In one embodiment, this process is repeated for each image capture parameter adjustment location, and, therefore, for each defined source document image block.

As a result, an image block optimized image of the source document is obtained for each defined source document image block such that a set of image block optimized images of the source document is created with each image block optimized image of the source document having been captured with the image capture device capture parameter setting set to the optimized image capture parameter setting for the respective source document image block.

In one embodiment, each of the image block optimized images of the source document is correlated to its respective source document image block, e.g., each of the image block optimized images of the source document is provided metadata to indicate which source document image block is optimized in the image block optimized source document image, the image capture parameter setting used to obtain the image block optimized image, and/or any other data associated with the individual image block optimized images of the source document desired.

In one embodiment, each image block optimized image of the source document is then processed such that data within the image block optimized image of the source document corresponding to the source document image block optimized in that image block optimized image of the source document is extracted, or cropped, to create extracted image data representing the optimized source document image block of the image block optimized image of the source document.

In one embodiment, this process is repeated for each image block optimized image of the source document included in the set of image block optimized document images of the source document. As a result, a set of extracted image data representing the set of optimized source document image blocks from each of the image block optimized document images of the source document is generated.

In one embodiment, once the set of extracted image data representing the set of optimized source document image blocks is obtained, the set of extracted image data representing the set of optimized source document image blocks is used to generate an image capture parameter optimized reconstruction of the source document where each image capture parameter optimized reconstruction image block is the optimized source document image block obtained from the image block optimized source document image of the source document, as captured with the image capture parameter setting on the image capture device optimized for that optimized source document image block.

In one embodiment, if post-image capture processing is required, such as brightness, contrast, color, image enhancement, and/or any other post-image capture adjustments, this processing is performed on each of the optimized source document image blocks individually. Consequently, the processing power required to perform the post-image capture processing can be minimized as the processing is localized to the individual optimized source document image blocks that actually require this processing.

In one embodiment, the generated image capture parameter optimized reconstruction of the source document is then provided to one or more data extraction engines, such as an OCR function, for identification and extraction of the data desired.

As a specific example, assume a source document is partitioned into four source document image blocks, e.g., quadrant one source document image block, quadrant two source document image block, quadrant three source document image block, and quadrant four source document image block. In this specific example, assume the image capture parameter is the focus setting for a camera function implemented on a smart phone.

In this specific example, it is stipulated that the image capture parameter adjustment location, i.e., the focus setting location, for each of the four source document image blocks is defined to be the center of the respective source document image blocks. It is further stipulated, that, in this specific example, the optimized focus setting for quadrant one source document image block is "00", the optimized focus setting for quadrant two source document image block is "10", the optimized focus setting for quadrant three source document image block is "20", and the optimized focus setting for quadrant four source document image block is "30".

In this specific example, four images of the source document would be captured: one with the camera's focus setting set to "00", to create a quadrant one image block optimized source document image; one with the camera's focus setting set to "10", to create a quadrant two image block optimized source document image; one with the camera's focus setting set to "20" to create a quadrant three image block optimized source document image; and one with the camera's focus setting set to "30" to create a quadrant four image block optimized source document image.

In this specific example, each of the four image block optimized source document images is correlated to its respective source document image block, or tagged, with desired metadata to indicate its respective source document image block, its focus setting, and any other information desired.

Each image block optimized image of the source document is then processed such that image data within the image block optimized image of the source document corresponding to the source document image block associated with, and optimized in, that image block optimized image of the source document is extracted, or cropped, to create extracted image data representing the source document image block optimized in the image block optimized image of the source document.

Consequently, in this specific example, the image data within quadrant one image block optimized source document image representing the quadrant one optimized source document image block is extracted; the image data within quadrant two image block optimized source document image representing the optimized quadrant two source document image block is extracted; the image data within quadrant three image block optimized source document image representing the quadrant three optimized source document image block is extracted; and the image data within quadrant four image block optimized source document image representing the quadrant four optimized source document image block is extracted, to obtain optimized quadrant one, optimized quadrant two, optimized quadrant three, and optimized quadrant four source document image blocks.

In this specific example, the optimized quadrant one, optimized quadrant two, optimized quadrant three, and optimized quadrant four source document image blocks are then used to generate a focus optimized reconstruction of the source document where each focus optimized source document image block is the optimized source document image block obtained from the image block optimized source document image of the source document captured with the focus setting on the image capture device optimized for that optimized source document image block.

In this specific illustrative example, the focus optimized reconstruction of the source document is then provided to an OCR engine for processing.

As another specific example, assume a source document is again partitioned into four source document image blocks, e.g., quadrant one source document image block, quadrant two source document image block, quadrant three source document image block, and quadrant four source document image block. In this specific example, assume the image capture parameter is the exposure setting for a camera function implemented on a smart phone.

In this specific example, it is stipulated that the adjustment location, i.e., the exposure setting location, for each of the four source document image blocks is defined to be the center of the respective source document image blocks. It is further stipulated that, in this specific example, the optimized exposure setting for quadrant one source document image block is "0.01", the optimized exposure setting for quadrant two source document image block is "0.02", the optimized exposure setting for quadrant three source document image block is "0.03", and the optimized exposure setting for quadrant four source document image block is "0.04".

In this specific example, four images of the source document would be captured: one with the camera's exposure setting set to "0.01", to create a quadrant one image block optimized source document image; one with the camera's exposure setting set to "0.02", to create a quadrant two image block optimized source document image; one with the camera's exposure setting set to "0.03" to create a quadrant three image block optimized source document image; and one with the camera's exposure setting set to "0.04" to create a quadrant four image block optimized source document image.

In this specific example, each of the four image block optimized source document images is correlated to its respective optimized source document image block, or tagged, with desired metadata to indicate its respective optimized source document image block, the exposure setting, and any other information desired.

The set of extracted image data representing the set of optimized source document image blocks is then aggregated, e.g., in this example, quadrant one image block optimized source document image, quadrant two image block optimized source document image, quadrant three image block optimized source document image, quadrant four image block optimized source document image are aggregated.

Each image block optimized image of the source document is then processed such that image data within the image block optimized image of the source document corresponding to the source document image block optimized in that image block optimized image of the source document is extracted, or cropped, to create extracted image data representing the optimized source document image block in the image block optimized image of the source document.

In this specific example, the image data within quadrant one image block optimized source document image representing the quadrant one optimized source document image block is extracted; the image data within quadrant two image block optimized source document image representing the quadrant two optimized source document image block is extracted; the image data within quadrant three image block optimized source document image representing the quadrant three optimized source document image block is extracted; and the image data within quadrant four image block optimized source document image representing the quadrant four optimized source document image block is extracted, to obtain optimized quadrant one, optimized quadrant two, optimized quadrant three, and optimized quadrant four source document image blocks.

In this specific example, the optimized quadrant one, optimized quadrant two, optimized quadrant three, and optimized quadrant four source document image blocks are then used to generate an exposure optimized reconstruction of the source document where each exposure optimized reconstruction image block is the optimized source document image block obtained from the image block optimized source document image of the source document captured with the exposure setting on the image capture device optimized for that optimized source document image block.

In this specific illustrative example, the exposure optimized reconstruction of the source document is then provided to an OCR engine for processing.

It is worth noting that in various embodiments, a first image capture parameter, such as the focus setting, and a second image capture parameter, such as the exposure setting, and/or both the first and second image capture parameters, can be selectively and alternatively optimized for individual source document images blocks, or sets of source document images blocks.

For instance, as a specific illustrative example, in one embodiment, a given source document image block, or sub-set of source document image blocks, of the given source document is optimized for the first image capture parameter, such as the focus setting, while another source document image block, or sub-set of source document image blocks, of the given source document is optimized for the second image capture parameter, such as the exposure setting.

As an even more specific illustrative example, assume the bottom left region of a source document is known to have mostly text-related source data, while the upper right region of the same source document is known to have visual image-related source data, such as a company logo, or a picture.

In this specific illustrative example, the source document image block, or blocks, assigned to the bottom left region of the source document are optimized for the focus setting, while the source document image block, or blocks, assigned to the upper right region of the source document are optimized for the exposure setting. In addition the source document image block, or blocks, assigned to the other regions of the source document may be optimized for both the focus setting and exposure setting, or may not be optimized at all.

Consequently, in various embodiments, multiple image capture parameters optimized for a single source document, and a single image capture parameter optimized image of the source document can be generated that is optimized for multiple image capture parameters in different regions of the optimized image of the source document. This provides significant flexibility to the user.

Using the system and method for creating optimized images for data identification and extraction discussed herein, optimized optical images of source documents are accurately, efficiently, and reliably generated and provided for data extraction processing without requiring the transfer of multiple images of the source document or requiring significant user input or action.

Hardware System Architecture

FIG. 1 is a block diagram of an exemplary hardware architecture for implementing one embodiment of a process for creating optimized images for data identification and extraction, such as exemplary processes 300 (FIG. 3) and 600 (FIG. 6) discussed herein.

Figure 6:
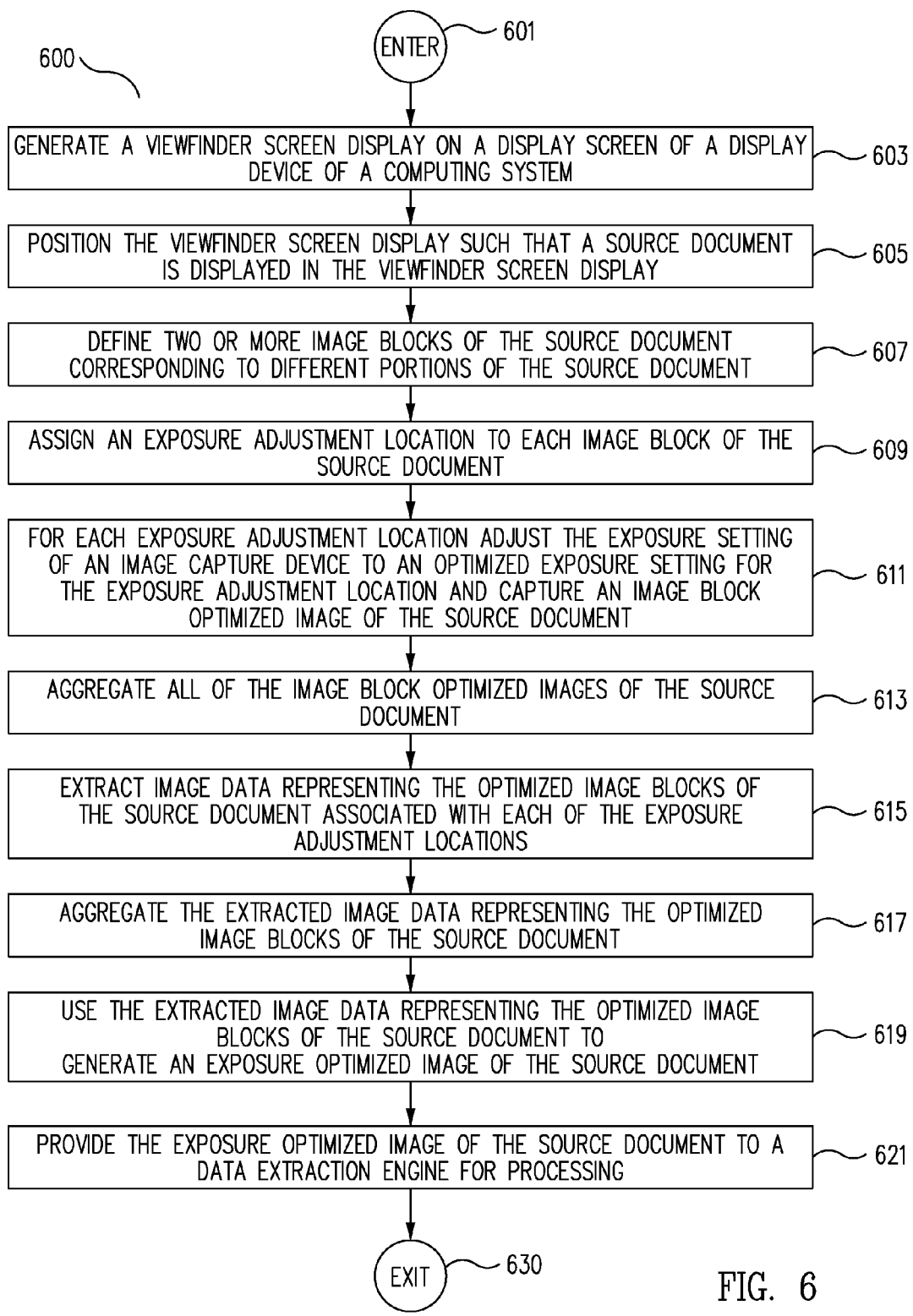
FIG. 6 is a flow chart depicting a process for creating optimized images for data identification and extraction in accordance with one embodiment.

Shown in FIG. 1 is a computing system 100, e.g., a computing system implementing all, of part, of a process for creating optimized images for data identification and extraction, such as exemplary processes 300 (FIG. 3) and 600 (FIG. 6).

In one embodiment, computing system 100 includes viewfinder screen display 143 displayed on display screen 141 of display device 140 of computing system 100; CPUs 120, memory 101, and optional data extraction engine 130.

In one embodiment, computing system 100 is a mobile computing system such as a smart phone, or other mobile device, including an integrated camera function, e.g., optical image capture device/function 109. However, computing system 100 can be any computing system as discussed herein, and/or as known in the art at the time of filing, and/or as developed thereafter, that includes components that can execute all, or part, of a process for creating optimized images for data identification and extraction in accordance with at least one of the embodiments as described herein.

In one embodiment, when a user of computing system 100 desires to capture an image of a source document for data extraction, the user activates an image capture function on computing system 100 (not shown). In one embodiment, activation of the image capture function causes viewfinder screen display 143 to be displayed on display screen 141 of the display device 140 of computing system 100.

In one embodiment, the user is then prompted to position viewfinder screen display 143, and/or computing system 100, such that an image of a source document is displayed as source document image 150 within viewfinder screen display 143.

In one embodiment, memory 101 includes all, or part, of image capture parameter data 104. In one embodiment, image capture parameter data 104 defines what image capture parameter(s) are to be optimized.

In various embodiments, the image capture parameters of image capture parameter data 104 can be, but are not limited to, one or more of, a focus setting for the image capture device of optical image capture device function 109, such as a camera function, associated with computing system 100; an exposure setting for optical image capture device function 109, such as a camera function, associated with computing system 100; and or any other image capture parameter that can be adjusted or set by image capture parameter setting data 110 on optical image capture device function 109, such as a camera function, associated with computing system 100, as discussed herein, and/or as known in the art at the time of filing, and/or as developed after the time of filing.

In one embodiment, memory 101 includes all, or part, of source document type data 103. In one embodiment, source document type data 103 includes data regarding the type, and/or source, of the source document of source document image 150, in one embodiment, as provided by user input through computing system 100.

In one embodiment, memory 101 includes all, or part, of source document image block determination module 105 which generates source document image block determination data 107. In one embodiment, the image of the source document of source document image 150, as displayed in viewfinder screen display 143, is partitioned into two or more source document image blocks, or regions.

In one embodiment, the one or more source document image blocks are determined at source document image block determination module 105 by defining two or more portions or regions of viewfinder screen display 143 that correspond to two or more portions of the image of source document of source document image 150 such that the image of the source document of source document image 150, as displayed in viewfinder screen display 143, is divided into source document image blocks of source document image block determination data 107 corresponding to the defined portions or regions of viewfinder screen display 143.

In one embodiment, the one or more source document image blocks are determined by first determining the size of the source document of source document image 150, in one embodiment using edge detection technology, and then partitioning the image of the source document of source document image 150, as displayed in viewfinder screen display 143, into source document image blocks or regions of source document image block determination data 107.

In various embodiments, the number of source document image blocks is determined at source document image block determination module 105 based, at least in part, on the resolution of optical image capture device/function 109, such as a camera function implemented on computing system 100, that will be used to capture one or more images of the source document, such as image block optimized images data 111A, 113A, 115A, and 117A.

As specific example, in some embodiments, the number of source document image blocks is set by source document image block determination module 105 at nine image blocks composed of a matrix or grid of three rows and three columns of image blocks. As another example, such as when optical image capture device/function 109 has a higher resolution, the number of source document image blocks is set by source document image block determination module 105 at 16 source document image blocks arranged in a matrix or grid of four rows and four columns. In other embodiments, the number of source document image blocks is set by source document image block determination module 105 at any number desired, and are arranged in any arrangements desired.

In one embodiment, the source document image blocks are defined by source document image block determination module 105 such that the source document image blocks are distributed evenly over the surface of the source document image, and are of the same size. In other embodiments, the source document image blocks are selected and sized by source document image block determination module 105 using source document type data 103 so that portions of the source document that are known to be of more significance, i.e., that are known to contain more desired information, are partitioned by a greater number of the source document image blocks, and, in some cases, smaller sized source document image blocks, than those portions of the source document known to be of less significance.

In one embodiment, the determination of the number, size, and distribution of source document image blocks by source document image block determination module 105 using source document type data 103 is based on the type of source document and, in some cases, the source of the source document. For instance, it is known that most source documents that are credit card statements, or bills, have more information of interest in the bottom third of the source document than in the rest of the document. Consequently, when the source document is identified by source document type data 103 as a credit card statement, or a bill, the source document image blocks are defined by source document image block determination module 105 such that more of the source document image blocks are directed to the bottom third of the source document then the rest of the source document.

In addition, it may be determined that a credit card statement from a specific given credit card provider includes the most critical information in the bottom third, and left half, of the source document. Consequently, in this specific illustrative example, when the source document is identified as a credit card statement from the specific given credit card provider by source document type data 103, the source document image blocks are defined by source document image block determination module 105 such that more of the source document image blocks are directed to the bottom third and left half of the source document than the rest of the source document.

Memory 101 also includes all, or part, of optical image capture device/function 109, including adjustable image capture parameter setting data 110.

In one embodiment, source document image block determination data 107 identifies the number, size, and placement, of source document image blocks and thereby defines the source document image blocks. In one embodiment, for each source document image block, an optimized image capture parameter setting is determined, as represented by image capture parameter setting data 110.

For each source document image block of source document image block determination data 107, the image capture parameter setting on, or for, optical image capture device/function 109, such as a camera function, is set using image capture parameter setting data 110 to the optimized image capture parameter setting for that source document image block. An image block optimized image of the source document, such as image block optimized image data 111A, 113A, 115A, and 117A, is then captured with the image capture parameter of optical image capture device/function 109 set by capture parameter setting data 110 to this optimized image capture parameter setting.

In one embodiment, this process is repeated for each source document image block to generate image block optimized image data 111A, 113A, 115A, and 117A.

As a result, an image block optimized image of the source document, such as image block optimized image data 111A, 113A, 115A, and 117A, is obtained for each defined source document image block such that a set of image block optimized images of the source document, e.g., image block optimized image data 111A, 113A, 115A, and 117A, is created with each image block optimized image of the source document having been captured with by optical image capture device/function 109 with the parameter setting set to the optimized image capture parameter setting of capture parameter setting data 110 for the respective source document image block.

In one embodiment, each of the image block optimized images of the source document, e.g., image block optimized image data 111A, 113A, 115A, and 117A, is correlated to its respective optimized source document image block, e.g., optimized source document image block data 111B, 113B, 115B, and 117B. In one embodiment each of the image block optimized images of the source document, e.g., image block optimized image data 111A, 113A, 115A, and 117A, is provided metadata, such as metadata 111C, 113C, 115C, and 117C, to indicate which source document image block of image block data 111B, 113B, 115B, and 117B is optimized in the image block optimized source document image, the image capture parameter setting used to obtain the image block optimized image, and/or any other data associated with the individual image block optimized images of the source document desired.

In one embodiment, memory 101 includes optimized source document image block data extraction module 121. In one embodiment, each image block optimized image of the source document, e.g., image block optimized image data 111A, 113A, 115A, and 117A, is processed by optimized source document image block data extraction module 121 such that data within the image block optimized image of the source document corresponding to the source document image block optimized in that image block optimized image of the source document is extracted, or cropped, to create extracted image data representing the optimized source document image block of the image block optimized image of the source document, e.g., optimized source document image block data 111B, 113B, 115B, and 117B.

In one embodiment, this process is repeated for each image block optimized image of the source document included in the set of image block optimized document images of the source document, e.g., image block optimized image data 111A, 113A, 115A, and 117A. As a result, a set of extracted image data representing the set of optimized source document image blocks from each of the image block optimized document images of the source document, e.g., optimized source document image block data 111B, 113B, 115B, and 117B, is generated.

In one embodiment, memory 101 includes reconstruction module 123 which generates image capture parameter optimized source document data 125. In one embodiment, once the set of extracted image data representing the set of optimized source document image blocks, e.g., optimized source document image block data 111B, 113B, 115B, and 117B, is obtained, the set of extracted image data representing the set of optimized source document image blocks is used to generate an image capture parameter optimized reconstruction of the source document, represented by image capture parameter optimized source document data 125, where each image block of image capture parameter optimized source document data 125 is the optimized source document image block, e.g., optimized source document image block data 111B, 113B, 115B, and 117B obtained from the image block optimized source document image of the source document, e.g., image block optimized image data 111A, 113A, 115A, and 117A, as captured with the image capture parameter setting on optical image capture device/function 109 optimized by image capture parameter setting data 110 for that optimized source document image block.

In one embodiment, image capture parameter optimized source document data 125 is then provided to one or more data extraction engines, such as an OCR function, for identification and extraction of the data desired. In on embodiment, at least one of the data extraction engines is implemented on computing system 100, shown as optional data extraction engine 130.

In various embodiments, computing system 100 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

In various embodiments, the elements shown in FIG. 1 are grouped into one or more processes, or sub-processes, used to implement all, or part of, a process for creating optimized images for data identification and extraction, such as exemplary processes 300 (FIG. 3) and 600 (FIG. 6) discussed herein.

Figure 2A:
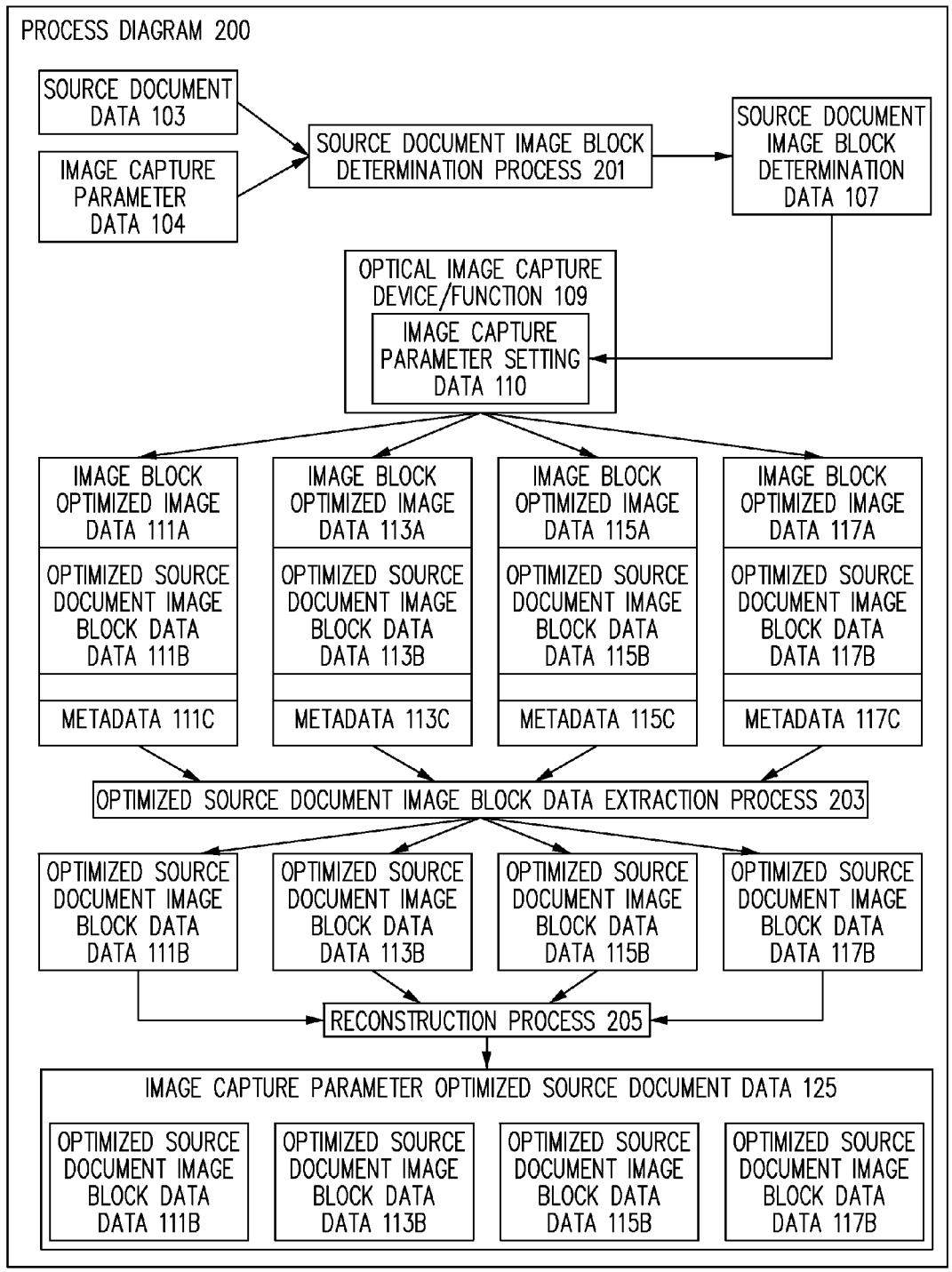
FIG. 2A is a process diagram of part of a process for creating optimized images for data identification and extraction in accordance with one embodiment.

FIG. 2A is a process diagram showing one illustrative example of the interaction of various illustrative processes, or sub-processes, 201, 203, and 205, used to implement all, or part of, a process for creating optimized images for data identification and extraction, such as exemplary processes 300 (FIG. 3) and 600 (FIG. 6) discussed herein.

Figure 2B:
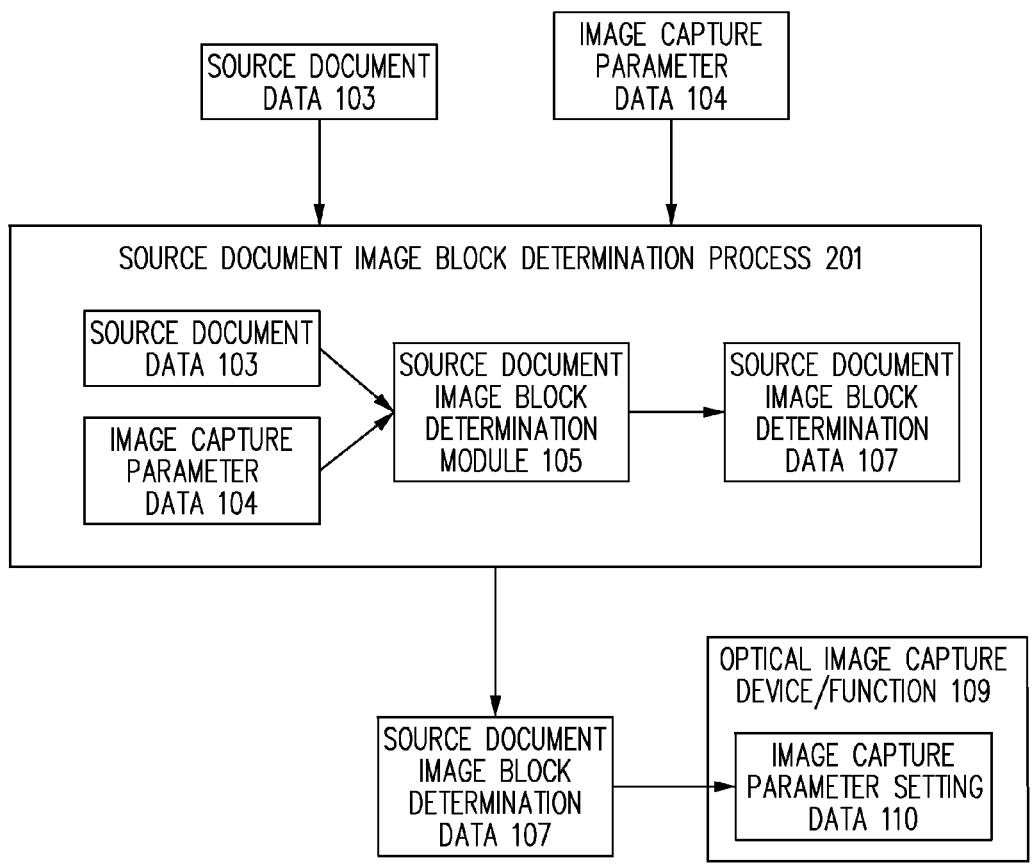
FIG. 2B shows a source document image block determination process in accordance with one embodiment.
Figure 2C:
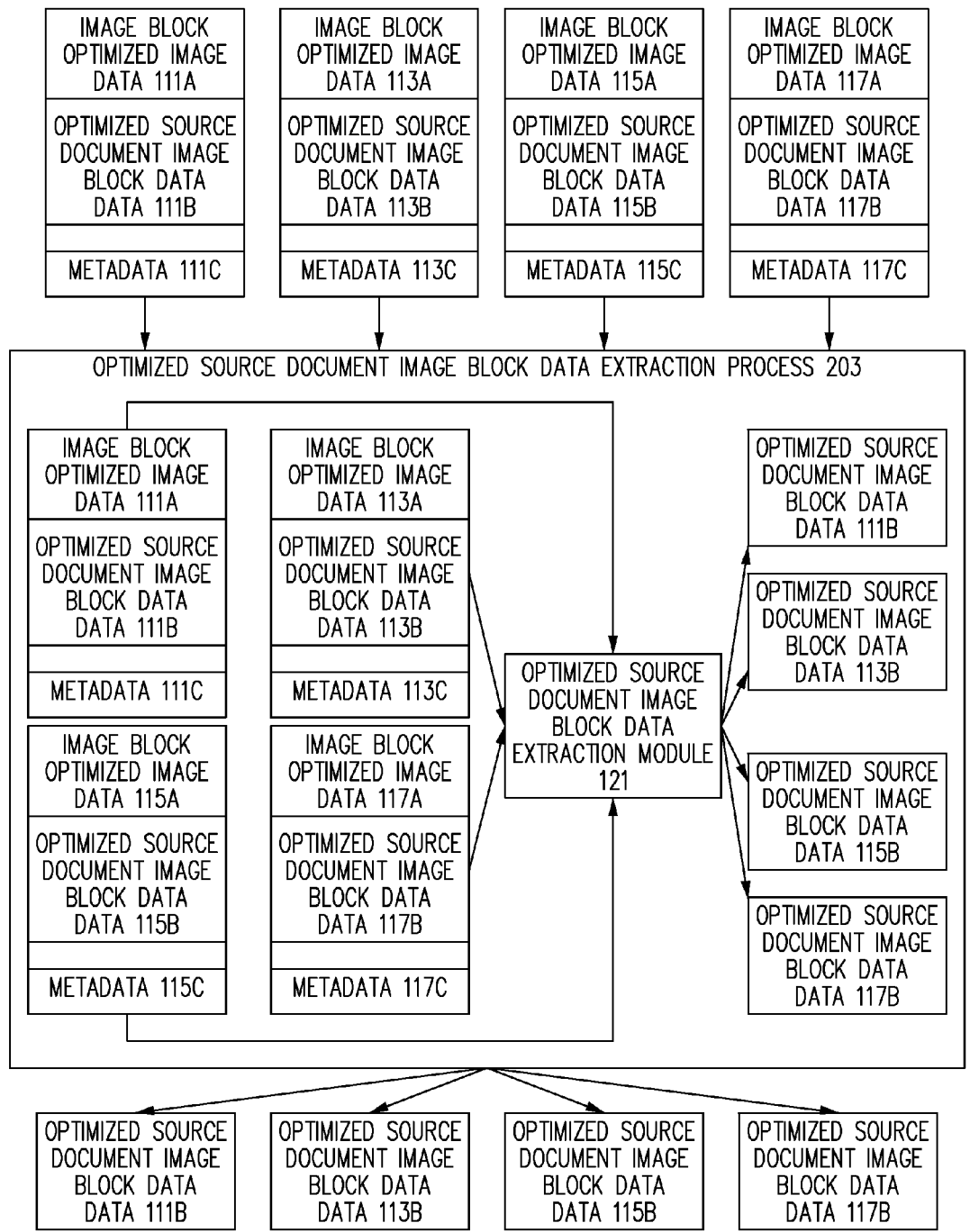
FIG. 2C shows an optimized source document image block data extraction process in accordance with one embodiment.
Figure 2D:
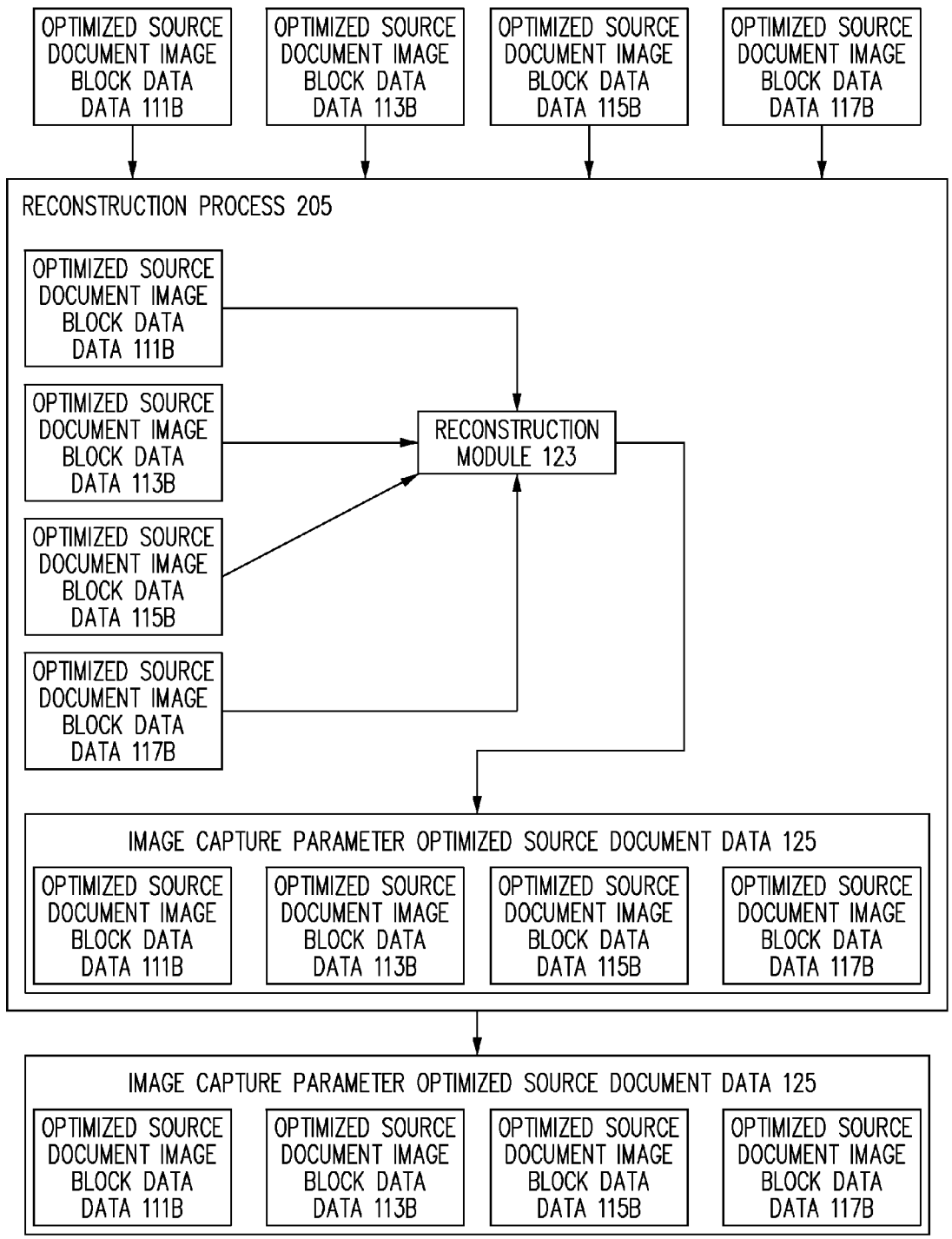
FIG. 2D shows an reconstruction process in accordance with one embodiment.

FIGS. 2B, 2C, and 2D show illustrative examples of processes 201, 203, and 205 in accordance with one embodiment.

Referring to FIG. 1, FIG. 2A, FIG. 2B, FIG. 2C, and FIG. 2D together, source document type data 103 and image capture parameter data 104 are provided to source document image block determination process 201 which generates source document image block determination data 107. FIG. 2B shows source document image block determination process 201 in more detail.

As seen in FIG. 2B, source document type data 103 and image capture parameter data 104 are provided as input data to source document image block determination module 105. In one embodiment, at source document image block determination module 105 source document type data 103 and image capture parameter data 104 are analyzed to generate source document image block determination data 107 under the direction of one or more processors, such as CPU 121 of FIG. 1, associated with one or more computing systems, such as a computing system 100 of FIG. 1.

As noted above, the number of source document image blocks is determined at source document image block determination module 105 based, at least in part, on the resolution of optical image capture device/function 109, such as a camera function implemented on computing system 100, that will be used to capture one or more images of the source document, such as image block optimized images data 111A, 113A, 115A, and 117A.

As discussed above, in one embodiment, source document image block determination data 107 is provided to optical image capture device/function 109 to determine image capture parameter setting data 110 for the capture of image block optimized images data 111A, 113A, 115A, and 117A.

Referring back to FIG. 1, FIG. 2A, FIG. 2B, FIG. 2C, and FIG. 2D together, in one embodiment, image block optimized image data 111A, 113A, 115A, and 117A, including optimized source document image block data 111B, 113B, 115B, and 117B and metadata 111C, 113C, 115C, and 117C, are provided to optimized source document image block data extraction process 203 which extracts optimized source document image block data 111B, 113B, 115B, and 117B. FIG. 2C shows optimized source document image block data extraction process 203 in more detail.

As seen in FIG. 2C, image block optimized image data 111A, 113A, 115A, and 117A, including optimized source document image block data 111B, 113B, 115B, and 117B and metadata 111C, 113C, 115C, and 117C, are provided as input data to optimized source document image block data extraction module 121. As discussed above, in one embodiment, at optimized source document image block data extraction module 121 optimized source document image block data 111B, 113B, 115B, and 117B are extracted from image block optimized image data 111A, 113A, 115A, and 117A.

Referring back to FIG. 1, FIG. 2A, FIG. 2B, FIG. 2C, and FIG. 2D together, in one embodiment, optimized source document image block data 111B, 113B, 115B, and 117B are provided to reconstruction process 205 which generates image capture parameter optimized source document data 125. FIG. 2D shows reconstruction process 205 in more detail.

As seen in FIG. 2D, optimized source document image block data 111B, 113B, 115B, and 117B are used as input data to reconstruction module 123 which transforms at least part of optimized source document image block data 111B, 113B, 115B, and 117B into image capture parameter optimized source document data 125.

As discussed above, at reconstruction module 123 optimized source document image block data 111B, 113B, 115B, and 117B are used by reconstruction module 123 to generate an image capture parameter optimized reconstruction of the source document, represented by image capture parameter optimized source document data 125, where each image block of image capture parameter optimized source document data 125 is the optimized source document image block, e.g., optimized source document image block data 111B, 113B, 115B, and 117B obtained from the image block optimized source document image of the source document, e.g., image block optimized image data 111A, 113A, 115A, and 117A, as captured with the image capture parameter setting on optical image capture device/function 109 optimized by image capture parameter setting data 110 for that optimized source document image block.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a system and method for creating optimized images for data identification and extraction includes generating a viewfinder screen display on a display screen of a display device. The viewfinder screen display is then positioned such that a source document is displayed in the viewfinder screen display.

In one embodiment, two or more source document image blocks corresponding to different portions and/or regions of the source document are defined. In one embodiment, for each source document image block the focus of an image capture device is set to an optimized focus setting for the source document image block.

In one embodiment, the image capture device then captures an image block optimized image of the source document optimized for the source document image block. In one embodiment, all of the image block optimized images of the source document are aggregated and for each image block optimized image of the source document, the image data representing the optimized source document image block in the image block optimized image of the source document is extracted.

In one embodiment, the extracted data representing the optimized image blocks of the source document are then aggregated and used to construct a focus optimized image of the source document. The focus optimized image of the source document is then provided to a data extraction engine for processing.

Figure 3:
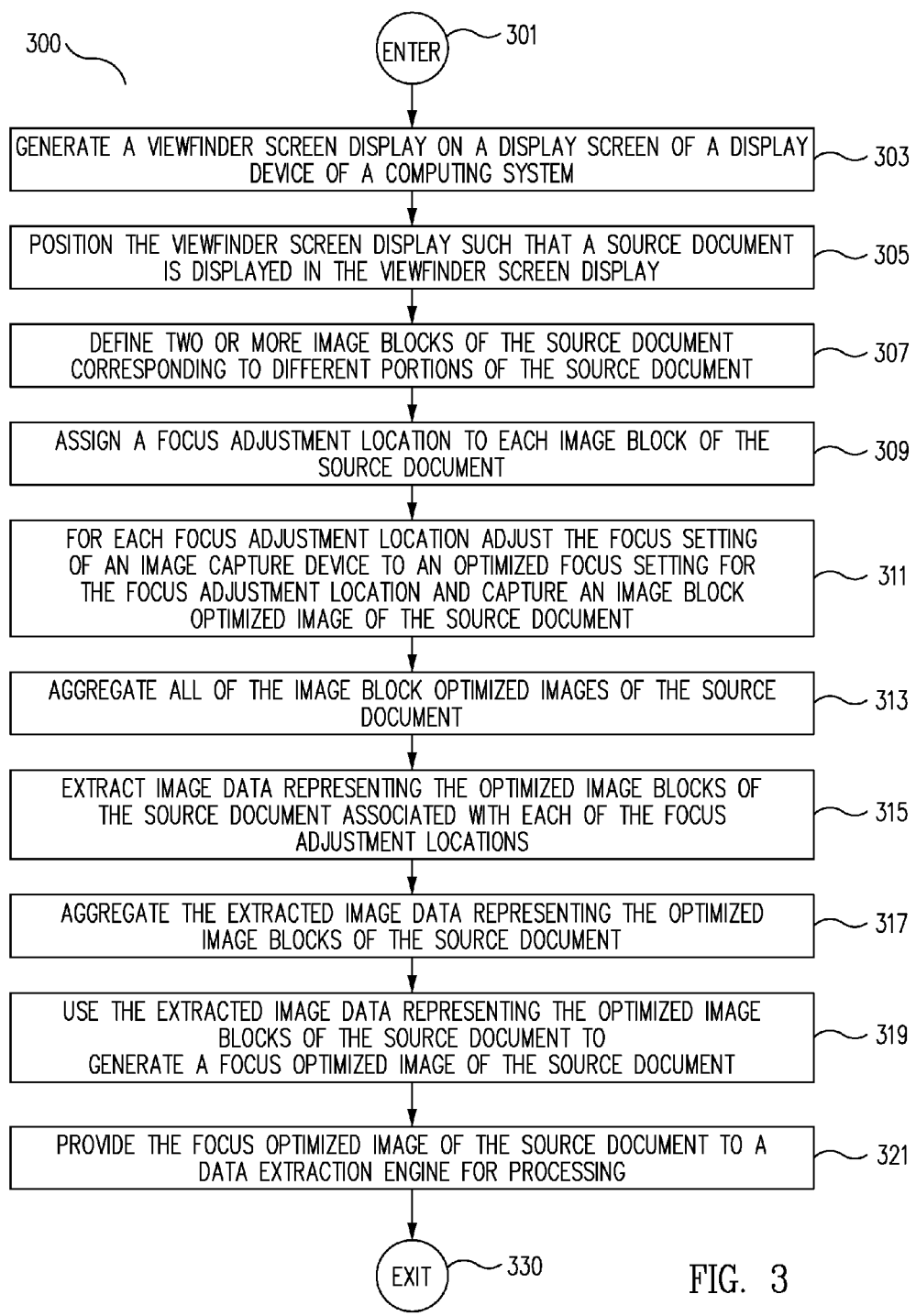
FIG. 3 is a flow chart depicting a process for creating optimized images for data identification and extraction in accordance with one embodiment.

FIG. 3 is a flow chart depicting a process 300 for creating optimized images for data identification and extraction in accordance with one embodiment.

Process 300 for creating optimized images for data identification and extraction begins at ENTER OPERATION 301 of FIG. 3 and process flow proceeds to GENERATE A VIEWFINDER SCREEN DISPLAY ON A DISPLAY SCREEN OF A DISPLAY DEVICE OF A COMPUTING SYSTEM OPERATION 303.

In one embodiment, at GENERATE A VIEWFINDER SCREEN DISPLAY ON A DISPLAY SCREEN OF A DISPLAY DEVICE OF A COMPUTING SYSTEM OPERATION 303 a viewfinder screen display is generated and displayed on a display screen of a display device.

In one embodiment, process 300 for creating optimized images for data identification and extraction includes one or more applications, such as software packages, modules, or systems, implemented on one or more computing systems through which a viewfinder screen display is generated.

In one embodiment, the viewfinder screen display is displayed on the display screen of the display device associated with a computing system. In one embodiment, the computing system also includes an image capture device function.

In one embodiment, the computing system is a mobile computing system such as a smart phone, or other mobile device, including an integrated camera function. However, in various other embodiments, the computing system is any computing system as discussed herein, and/or as known in the art at the time of filing, and/or as developed after the time of filing.

In one embodiment, when a user desires to capture an image of a source document for data extraction, the user activates an image capture function on the computing system.

In one embodiment, activation of the image capture function causes the viewfinder screen display to be displayed on the display screen of the display device of the computing system at GENERATE A VIEWFINDER SCREEN DISPLAY ON A DISPLAY SCREEN OF A DISPLAY DEVICE OF A COMPUTING SYSTEM OPERATION 303.

In one embodiment, once a viewfinder screen display is generated and displayed on a display screen of a display device at GENERATE A VIEWFINDER SCREEN DISPLAY ON A DISPLAY SCREEN OF A DISPLAY DEVICE OF A COMPUTING SYSTEM OPERATION 303, process flow proceeds to POSITION THE VIEWFINDER SCREEN DISPLAY SUCH THAT A SOURCE DOCUMENT IS DISPLAYED IN THE VIEWFINDER SCREEN DISPLAY OPERATION 305.

In one embodiment, at POSITION THE VIEWFINDER SCREEN DISPLAY SUCH THAT A SOURCE DOCUMENT IS DISPLAYED IN THE VIEWFINDER SCREEN DISPLAY OPERATION 305, the user is prompted to position the viewfinder screen display of GENERATE A VIEWFINDER SCREEN DISPLAY ON A DISPLAY SCREEN OF A DISPLAY DEVICE OF A COMPUTING SYSTEM OPERATION 303, and/or the computing device, with respect to a source document such that the source document is displayed within the viewfinder screen display.

As noted above, in various embodiments, the source document can be any hard copy, or printed, document such as, but not limited to, a bill, an invoice, a bank statement, a credit card statement, a document associated with a financial transaction, a tax document, a warranty document, or any other hard copy or printed document, as discussed herein, and/or as known in the art at the time of filing, and/or as developed after the time of filing.

In one embodiment, once the user is prompted to position the viewfinder screen display of GENERATE A VIEWFINDER SCREEN DISPLAY ON A DISPLAY SCREEN OF A DISPLAY DEVICE OF A COMPUTING SYSTEM OPERATION 303, and/or the computing device, with respect to a source document such that the source document is displayed within the viewfinder screen display at POSITION THE VIEWFINDER SCREEN DISPLAY SUCH THAT A SOURCE DOCUMENT IS DISPLAYED IN THE VIEWFINDER SCREEN DISPLAY OPERATION 305, process flow proceeds to DEFINE TWO OR MORE IMAGE BLOCKS OF THE SOURCE DOCUMENT CORRESPONDING TO DIFFERENT PORTIONS OF THE SOURCE DOCUMENT OPERATION 307.

In one embodiment, at DEFINE TWO OR MORE IMAGE BLOCKS OF THE SOURCE DOCUMENT CORRESPONDING TO DIFFERENT PORTIONS OF THE SOURCE DOCUMENT OPERATION 307, the image of the source document of POSITION THE VIEWFINDER SCREEN DISPLAY SUCH THAT A SOURCE DOCUMENT IS DISPLAYED IN THE VIEWFINDER SCREEN DISPLAY OPERATION 305, as displayed in the viewfinder screen display of GENERATE A VIEWFINDER SCREEN DISPLAY ON A DISPLAY SCREEN OF A DISPLAY DEVICE OF A COMPUTING SYSTEM OPERATION 303, is partitioned into two or more source document image blocks, or regions.

In one embodiment, the one or more source document image blocks are determined at DEFINE TWO OR MORE IMAGE BLOCKS OF THE SOURCE DOCUMENT CORRESPONDING TO DIFFERENT PORTIONS OF THE SOURCE DOCUMENT OPERATION 307 by defining two or more portions or regions of the viewfinder screen display of GENERATE A VIEWFINDER SCREEN DISPLAY ON A DISPLAY SCREEN OF A DISPLAY DEVICE OF A COMPUTING SYSTEM OPERATION 303 that correspond to two or more portions of the source document such that the image of the source document, as displayed in the viewfinder screen display, is divided into source document image blocks corresponding to the defined portions or regions of the viewfinder screen display.

In one embodiment, the one or more source document image blocks are determined at DEFINE TWO OR MORE IMAGE BLOCKS OF THE SOURCE DOCUMENT CORRESPONDING TO DIFFERENT PORTIONS OF THE SOURCE DOCUMENT OPERATION 307 by first determining the size of the source document of POSITION THE VIEWFINDER SCREEN DISPLAY SUCH THAT A SOURCE DOCUMENT IS DISPLAYED IN THE VIEWFINDER SCREEN DISPLAY OPERATION 305, in one embodiment using edge detection technology, and then partitioning the image of the source document, as displayed in the viewfinder screen display, into source document image blocks or regions.

In various embodiments, the number of source document image blocks is determined at DEFINE TWO OR MORE IMAGE BLOCKS OF THE SOURCE DOCUMENT CORRESPONDING TO DIFFERENT PORTIONS OF THE SOURCE DOCUMENT OPERATION 307 based, at least in part, on the resolution of the image capture device, such as a camera function implemented on the computing system, that will be used to capture one or more images of the source document.

As specific example, in some embodiments, DEFINE TWO OR MORE IMAGE BLOCKS OF THE SOURCE DOCUMENT CORRESPONDING TO DIFFERENT PORTIONS OF THE SOURCE DOCUMENT OPERATION 307 the number of source document image blocks is set at nine image blocks composed of a matrix of three rows and three columns of image blocks.

As another example, such as when the image capture device has a higher resolution, at DEFINE TWO OR MORE IMAGE BLOCKS OF THE SOURCE DOCUMENT CORRESPONDING TO DIFFERENT PORTIONS OF THE SOURCE DOCUMENT OPERATION 307 the number of source document image blocks is set at 16 source document image blocks arranged in a matrix of four rows and four columns.

In other embodiments, at DEFINE TWO OR MORE IMAGE BLOCKS OF THE SOURCE DOCUMENT CORRESPONDING TO DIFFERENT PORTIONS OF THE SOURCE DOCUMENT OPERATION 307 the number of source document image blocks is set at any number desired, and are arranged in any arrangements desired.

In one embodiment, the source document image blocks are defined at DEFINE TWO OR MORE IMAGE BLOCKS OF THE SOURCE DOCUMENT CORRESPONDING TO DIFFERENT PORTIONS OF THE SOURCE DOCUMENT OPERATION 307 such that the source document image blocks are distributed evenly over the entire surface of the source document image, and are of the same size.

In other embodiments, the source document image blocks are selected and sized at DEFINE TWO OR MORE IMAGE BLOCKS OF THE SOURCE DOCUMENT CORRESPONDING TO DIFFERENT PORTIONS OF THE SOURCE DOCUMENT OPERATION 307 so that portions of the source document that are known to be of more significance, i.e., that are known to contain more desired information, are partitioned by a greater number of the source document image blocks, and, in some cases, smaller sized source document image blocks, than those portions of the source document known to be of less significance.

In one embodiment, the determination of the number, size, and distribution of source document image blocks of DEFINE TWO OR MORE IMAGE BLOCKS OF THE SOURCE DOCUMENT CORRESPONDING TO DIFFERENT PORTIONS OF THE SOURCE DOCUMENT OPERATION 307 is based on the type of source document and, in some cases, the source of the source document.

For instance, it is known that most source documents that are credit card statements, or bills, have more information of interest in the bottom third of the source document than in the rest of the document. Consequently, when the source document is identified as a credit card statement, or a bill, the source document image blocks are defined at DEFINE TWO OR MORE IMAGE BLOCKS OF THE SOURCE DOCUMENT CORRESPONDING TO DIFFERENT PORTIONS OF THE SOURCE DOCUMENT OPERATION 307 such that more of the source document image blocks are directed to the bottom third of the source document then the rest of the source document.

In addition, it may be determined that a credit card statement from a specific given credit card provider includes the most critical information in the bottom third, and left half, of the source document. Consequently, in this specific illustrative example, when the source document is identified as a credit card statement from the specific given credit card provider, the source document image blocks are defined at DEFINE TWO OR MORE IMAGE BLOCKS OF THE SOURCE DOCUMENT CORRESPONDING TO DIFFERENT PORTIONS OF THE SOURCE DOCUMENT OPERATION 307 such that more of the source document image blocks are directed to the bottom third and left half of the source document than the rest of the source document.

In one embodiment, data regarding the type, and/or source, of a source document is provided at DEFINE TWO OR MORE IMAGE BLOCKS OF THE SOURCE DOCUMENT CORRESPONDING TO DIFFERENT PORTIONS OF THE SOURCE DOCUMENT OPERATION 307 by user input through the computing system.

In one embodiment, data regarding the location of the most critical information in various types of source documents is stored in one or more databases, as discussed herein, known at the time of filing, or as developed thereafter.

Figure 4A:
FIG. 4A shows a source document image, as displayed on a viewfinder display screen, partitioned into eleven source document image blocks, in accordance with one embodiment.

FIG. 4A shows a source document image 400, as displayed on a viewfinder display screen at POSITION THE VIEWFINDER SCREEN DISPLAY SUCH THAT A SOURCE DOCUMENT IS DISPLAYED IN THE VIEWFINDER SCREEN DISPLAY OPERATION 305, partitioned into eleven source document image blocks, 401, 403, 405, 407, 409, 411, 413, 415, 417, 419, and 421, in accordance with one embodiment.

As seen in FIG. 4A, in this specific illustrative example, source document image 400 is an image of a statement from a "Macy's" credit account. As also seen in FIG. 4A, a great number, 9 of 11, source document image blocks, i.e., source document image blocks 405, 407, 409, 411, 413, 415, 417, 419, and 421, are positioned in the bottom third of source document image 400 than in the rest of source document image 400, i.e., only source document blocks 401 and 403 are positioned in the remaining two thirds of source document image 400.

Returning to FIG. 3, in one embodiment, once the image of the source document of POSITION THE VIEWFINDER SCREEN DISPLAY SUCH THAT A SOURCE DOCUMENT IS DISPLAYED IN THE VIEWFINDER SCREEN DISPLAY OPERATION 305, as displayed in the viewfinder screen display of GENERATE A VIEWFINDER SCREEN DISPLAY ON A DISPLAY SCREEN OF A DISPLAY DEVICE OF A COMPUTING SYSTEM OPERATION 303, is partitioned into two or more source document image blocks, or regions at DEFINE TWO OR MORE IMAGE BLOCKS OF THE SOURCE DOCUMENT CORRESPONDING TO DIFFERENT PORTIONS OF THE SOURCE DOCUMENT OPERATION 307, process flow proceeds to ASSIGN A FOCUS ADJUSTMENT LOCATION TO EACH SOURCE DOCUMENT IMAGE BLOCK OPERATION 309.

In one embodiment, at ASSIGN A FOCUS ADJUSTMENT LOCATION TO EACH SOURCE DOCUMENT IMAGE BLOCK OPERATION 309 for each defined source document image block of DEFINE TWO OR MORE IMAGE BLOCKS OF THE SOURCE DOCUMENT CORRESPONDING TO DIFFERENT PORTIONS OF THE SOURCE DOCUMENT OPERATION 307 a focus adjustment location is defined that lies within the defined source document image block.

For instance, in one embodiment, at ASSIGN A FOCUS ADJUSTMENT LOCATION TO EACH SOURCE DOCUMENT IMAGE BLOCK OPERATION 309 for each defined source document image block of DEFINE TWO OR MORE IMAGE BLOCKS OF THE SOURCE DOCUMENT CORRESPONDING TO DIFFERENT PORTIONS OF THE SOURCE DOCUMENT OPERATION 307 a focus point is defined, such as the center of the respective source document image block.

In one embodiment, once a focus adjustment location is defined for each defined source document image block of DEFINE TWO OR MORE IMAGE BLOCKS OF THE SOURCE DOCUMENT CORRESPONDING TO DIFFERENT PORTIONS OF THE SOURCE DOCUMENT OPERATION 307 at ASSIGN A FOCUS ADJUSTMENT LOCATION TO EACH SOURCE DOCUMENT IMAGE BLOCK OPERATION 309, process flow proceeds to FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311.

In one embodiment, at FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311 for each focus adjustment location, or each source document image block, of ASSIGN A FOCUS ADJUSTMENT LOCATION TO EACH SOURCE DOCUMENT IMAGE BLOCK OPERATION 309, an optimized focus setting is determined and the focus setting on, or for, the image capture device is set to the optimized focus setting for that focus adjustment location and an image block optimized image of the source document is captured with the focus set to this optimized focus setting.

In one embodiment, at FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311 for each focus adjustment location of ASSIGN A FOCUS ADJUSTMENT LOCATION TO EACH SOURCE DOCUMENT IMAGE BLOCK OPERATION 309, an optimized focus setting is determined.

In one embodiment, at FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311 for each focus adjustment location, the focus setting on, or for, the image capture device, such as a camera function, is set to the optimized focus setting for that focus adjustment location, in one embodiment automatically.

In one embodiment, at FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311 an image block optimized image of the source document is then captured with the focus set to this optimized focus setting, in one embodiment, automatically.

In one embodiment, at FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311 the process above is repeated for each focus adjustment location, and, therefore, for each defined source document image block of DEFINE TWO OR MORE IMAGE BLOCKS OF THE SOURCE DOCUMENT CORRESPONDING TO DIFFERENT PORTIONS OF THE SOURCE DOCUMENT OPERATION 307.

In one embodiment, once for each focus adjustment location, or source document image block, of ASSIGN A FOCUS ADJUSTMENT LOCATION TO EACH SOURCE DOCUMENT IMAGE BLOCK OPERATION 309, an optimized focus setting is determined and the focus setting on, or for, the image capture device is set to the optimized focus setting for that focus adjustment location, or source document image block, and an image block optimized image of the source document is captured with the focus set to the optimized focus setting at FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311, process flow proceeds to AGGREGATE ALL OF THE IMAGE BLOCK OPTIMIZED IMAGES OF THE SOURCE DOCUMENT OPERATION 313.

In one embodiment, at AGGREGATE ALL OF THE IMAGE BLOCK OPTIMIZED IMAGES OF THE SOURCE DOCUMENT OPERATION 313, the image block optimized images of the source document of FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311 are correlated and aggregated into a set of image block optimized images of the source document.

As a result of the processing at FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311, an image block optimized image of the source document is obtained for each defined source document image block. Consequently, a set of image block optimized images of the source document is created with each image block optimized image of the source document having been captured with the image capture device focus setting set to the optimized focus setting for the respective source document image block.

In one embodiment, each of the image block optimized images of the source document is correlated to its respective source document image block.

In one embodiment, each of the image block optimized images of the source document is provided metadata to indicate which source document image block is associated the image block optimized source document image, the focus setting used to obtain the image block optimized image, and/or any other data associated with the individual image block optimized images of the source document desired.

In one embodiment, at AGGREGATE ALL OF THE IMAGE BLOCK OPTIMIZED IMAGES OF THE SOURCE DOCUMENT OPERATION 313, the related correlated or tagged image block optimized images of the source document are aggregated into a set of image block optimized images of the source document.

In one embodiment, once the image block optimized images of the source document of FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311 are correlated and aggregated into a set of image block optimized images of the source document at AGGREGATE ALL OF THE IMAGE BLOCK OPTIMIZED IMAGES OF THE SOURCE DOCUMENT OPERATION 313, process flow proceeds to EXTRACT IMAGE DATA REPRESENTING THE OPTIMIZED IMAGE BLOCKS OF THE SOURCE DOCUMENT ASSOCIATED WITH EACH OF THE FOCUS ADJUSTMENT LOCATIONS OPERATION 315.

In one embodiment, at EXTRACT IMAGE DATA REPRESENTING THE OPTIMIZED IMAGE BLOCKS OF THE SOURCE DOCUMENT ASSOCIATED WITH EACH OF THE FOCUS ADJUSTMENT LOCATIONS OPERATION 315 each image block optimized image of the source document of AGGREGATE ALL OF THE IMAGE BLOCK OPTIMIZED IMAGES OF THE SOURCE DOCUMENT OPERATION 313 is processed such that image data within the image block optimized image of the source document corresponding to the source document image block optimized in that image block optimized image of the source document is extracted, or cropped, to create extracted image data representing the optimized source document image block.

FIGS. 4B through 4D show extracted image data representing the optimized image blocks 401, 403, and 407 of FIG. 4A and their respective metadata.

FIG. 4B shows extracted image data representing the optimized image block 401 of FIG. 4A, in accordance with one embodiment.

FIG. 4C shows extracted image data representing the optimized image block 403 of FIG. 4A, in accordance with one embodiment.

FIG. 4D shows extracted image data representing the optimized image block 407 of FIG. 4A, in accordance with one embodiment.

Despite the fact that only three portions of extracted image data representing the optimized image blocks 403, 405 and 407 are shown, the process is repeated for each image block optimized image of the source document included in the set of image block optimized document images of the source document, i.e., extracted image data representing the optimized image blocks 405, 409, 411, 413, 415, 417, 419, and 421 are also generated.

Consequently, returning to FIG. 3, at EXTRACT IMAGE DATA REPRESENTING THE OPTIMIZED IMAGE BLOCKS OF THE SOURCE DOCUMENT ASSOCIATED WITH EACH OF THE FOCUS ADJUSTMENT LOCATIONS OPERATION 315 extracted image data representing the set of optimized source document image blocks optimized in each of the image block optimized document images of the source document is generated.

In one embodiment, once each image block optimized image of the source document of AGGREGATE ALL OF THE IMAGE BLOCK OPTIMIZED IMAGES OF THE SOURCE DOCUMENT OPERATION 313 is processed such that image data within the image block optimized image of the source document corresponding to the source document image block optimized in that image block optimized image of the source document is extracted, or cropped, to create extracted image data representing the optimized source document image block in the image block optimized image of the source document at EXTRACT IMAGE DATA REPRESENTING THE OPTIMIZED IMAGE BLOCKS OF THE SOURCE DOCUMENT ASSOCIATED WITH EACH OF THE FOCUS ADJUSTMENT LOCATIONS OPERATION 315, process flow proceeds to AGGREGATE THE EXTRACTED IMAGE DATA REPRESENTING THE OPTIMIZED IMAGE BLOCKS OF THE SOURCE DOCUMENT OPERATION 317.

In one embodiment, at AGGREGATE THE EXTRACTED IMAGE DATA REPRESENTING THE OPTIMIZED IMAGE BLOCKS OF THE SOURCE DOCUMENT OPERATION 317 all the extracted image data representing the set of optimized source document image blocks optimized in each of the image block optimized document images of the source document of EXTRACT IMAGE DATA REPRESENTING THE OPTIMIZED IMAGE BLOCKS OF THE SOURCE DOCUMENT ASSOCIATED WITH EACH OF THE FOCUS ADJUSTMENT LOCATIONS OPERATION 315 are aggregated into a set of extracted image data representing the set of optimized source document image blocks.

As a result, of the processing at EXTRACT IMAGE DATA REPRESENTING THE OPTIMIZED IMAGE BLOCKS OF THE SOURCE DOCUMENT ASSOCIATED WITH EACH OF THE FOCUS ADJUSTMENT LOCATIONS OPERATION 315 extracted image data representing optimized source document image blocks optimized in each of the image block optimized document images of the source document is generated. In one embodiment, at AGGREGATE THE EXTRACTED IMAGE DATA REPRESENTING THE OPTIMIZED IMAGE BLOCKS OF THE SOURCE DOCUMENT OPERATION 317 all the extracted image data representing the set of optimized source document image blocks associated with the source document are aggregated to generate a set of extracted image data representing the set of optimized source document image blocks optimized from each of the image block optimized document images of the source document.

In one embodiment, once all the extracted image data representing the set of optimized source document image blocks from each of the image block optimized document images of the source document of EXTRACT IMAGE DATA REPRESENTING THE OPTIMIZED IMAGE BLOCKS OF THE SOURCE DOCUMENT ASSOCIATED WITH EACH OF THE FOCUS ADJUSTMENT LOCATIONS OPERATION 315 are aggregated into a set of extracted image data representing the set of optimized source document image blocks at AGGREGATE THE EXTRACTED IMAGE DATA REPRESENTING THE OPTIMIZED IMAGE BLOCKS OF THE SOURCE DOCUMENT OPERATION 317, process flow proceeds to USE THE EXTRACTED IMAGE DATA REPRESENTING THE OPTIMIZED IMAGE BLOCKS OF THE SOURCE DOCUMENT TO GENERATE A FOCUS OPTIMIZED IMAGE OF THE SOURCE DOCUMENT OPERATION 319.

In one embodiment, at USE THE EXTRACTED IMAGE DATA REPRESENTING THE OPTIMIZED IMAGE BLOCKS OF THE SOURCE DOCUMENT TO GENERATE A FOCUS OPTIMIZED IMAGE OF THE SOURCE DOCUMENT OPERATION 319 the set of extracted image data representing the set of optimized source document image blocks of AGGREGATE THE EXTRACTED IMAGE DATA REPRESENTING THE OPTIMIZED IMAGE BLOCKS OF THE SOURCE DOCUMENT OPERATION 317 is used to generate an focus optimized reconstruction of the source document such that each focus optimized reconstruction of the source document image block is the optimized source document image block obtained from the image block optimized source document image of the source document captured with the focus setting on the image capture device optimized for that optimized source document image block.

FIG. 5 shows a focus optimized image of the source document 500, generated in accordance with one embodiment, using the extracted image data representing the optimized image blocks 405, 409, 411, 413, 415, 417, 419, and 421 of FIGS. 4A to 4D.

Returning to FIG. 3, in one embodiment, if post-image capture processing is required, such as brightness, contrast, color, image enhancement, and/or any other post-image capture adjustments, this processing is performed on each of the optimized source document image blocks individually. Consequently, the processing power required to perform the post-image capture processing can be minimized as the processing is localized to the individual optimized source document image blocks that actually require this processing.

In one embodiment, once the set of extracted image data representing the set of optimized source document image blocks of AGGREGATE THE EXTRACTED IMAGE DATA REPRESENTING THE OPTIMIZED IMAGE BLOCKS OF THE SOURCE DOCUMENT OPERATION 317 is used to generate an focus optimized reconstruction of the source document at USE THE EXTRACTED IMAGE DATA REPRESENTING THE OPTIMIZED IMAGE BLOCKS OF THE SOURCE DOCUMENT TO GENERATE A FOCUS OPTIMIZED IMAGE OF THE SOURCE DOCUMENT OPERATION 319, process flow proceeds to PROVIDE THE FOCUS OPTIMIZED IMAGE OF THE SOURCE DOCUMENT TO A DATA EXTRACTION ENGINE FOR PROCESSING OPERATION 321.

In one embodiment, at PROVIDE THE FOCUS OPTIMIZED IMAGE OF THE SOURCE DOCUMENT TO A DATA EXTRACTION ENGINE FOR PROCESSING OPERATION 321 the generated focus optimized reconstruction of the source document is provided to one or more data extraction engines, such as an OCR function, for identification and extraction of the data desired.

As a specific example of the operation of one embodiment of process 300 for creating optimized images for data identification and extraction, assume a source document is partitioned into four source document image blocks at DEFINE TWO OR MORE IMAGE BLOCKS OF THE SOURCE DOCUMENT CORRESPONDING TO DIFFERENT PORTIONS OF THE SOURCE DOCUMENT OPERATION 307, e.g., quadrant one source document image block, quadrant two source document image block, quadrant three source document image block, and quadrant four source document image block. In this specific example, assume the image capture parameter is the focus setting for a camera function implemented on a smart phone.

In this specific example, it is stipulated that at ASSIGN A FOCUS ADJUSTMENT LOCATION TO EACH IMAGE BLOCK OF THE SOURCE DOCUMENT OPERATION 309 the focus adjustment location, i.e., the focus setting location, for each of the four source document image blocks is defined to be the center of the respective source document image blocks. It is further stipulated, that in this specific example, it is determined at FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311 that the optimized focus setting for quadrant one source document image block is "00", the optimized focus setting for quadrant two source document image block is "10", the optimized focus setting for quadrant three source document image block is "20", and the optimized focus setting for quadrant four source document image block is "30".

In this specific example, at FOR EACH FOCUS ADJUSTMENT LOCATION ADJUST THE FOCUS SETTING OF AN IMAGE CAPTURE DEVICE TO AN OPTIMIZED FOCUS SETTING FOR THE FOCUS ADJUSTMENT LOCATION AND CAPTURE AN IMAGE BLOCK OPTIMIZED IMAGE OF THE SOURCE DOCUMENT OPERATION 311 four images of the source document would be captured: one with the camera's focus setting set to "00", to create a quadrant one image block optimized source document image; one with the camera's focus setting set to "10", to create a quadrant two image block optimized source document image; one with the camera's focus setting set to "20" to create a quadrant three image block optimized source document image; and one with the camera's focus setting set to "30" to create a quadrant four image block optimized source document image.

In this specific example, at AGGREGATE ALL OF THE IMAGE BLOCK OPTIMIZED IMAGES OF THE SOURCE DOCUMENT OPERATION 313 each of the four image block optimized source document images is correlated to its respective source document image block, or tagged with desired metadata to indicate its respective source document image block, its focus setting, and any other information desired.

Each image block optimized image of the source document is then processed at EXTRACT IMAGE DATA REPRESENTING THE OPTIMIZED IMAGE BLOCKS OF THE SOURCE DOCUMENT ASSOCIATED WITH EACH OF THE FOCUS ADJUSTMENT LOCATIONS OPERATION 315 such that image data within the image block optimized image of the source document corresponding to the source document image block optimized in that image block optimized image of the source document is extracted, or cropped, to create extracted image data representing the optimized source document image block optimized in the image block optimized image of the source document.

Consequently, in this specific example, at EXTRACT IMAGE DATA REPRESENTING THE OPTIMIZED IMAGE BLOCKS OF THE SOURCE DOCUMENT ASSOCIATED WITH EACH OF THE FOCUS ADJUSTMENT LOCATIONS OPERATION 315 the image data within quadrant one image block optimized source document image representing the quadrant one optimized source document image block is extracted; the image data within quadrant two image block optimized source document image representing the quadrant two optimized source document image block is extracted; the image data within quadrant three image block optimized source document image representing the quadrant three optimized source document image block is extracted; and the image data within quadrant four image block optimized source document image representing the quadrant four optimized source document image block is extracted, to obtain optimized quadrant one, optimized quadrant two, optimized quadrant three, and optimized quadrant four source document image blocks.

In this specific example, at AGGREGATE THE EXTRACTED IMAGE DATA REPRESENTING THE OPTIMIZED IMAGE BLOCKS OF THE SOURCE DOCUMENT OPERATION 317 optimized quadrant one, optimized quadrant two, optimized quadrant three, and optimized quadrant four source document image blocks are aggregated and then at USE THE EXTRACTED IMAGE DATA REPRESENTING THE OPTIMIZED IMAGE BLOCKS OF THE SOURCE DOCUMENT TO GENERATE A FOCUS OPTIMIZED IMAGE OF THE SOURCE DOCUMENT OPERATION 319 they are used to generate a focus optimized reconstruction of the source document where each focus optimized reconstruction of the source document image block is the optimized source document image block obtained from the image block optimized source document image of the source document captured with the focus setting on the image capture device optimized for that source document image block.

In this specific illustrative example, at PROVIDE THE FOCUS OPTIMIZED IMAGE OF THE SOURCE DOCU- MENT TO A DATA EXTRACTION ENGINE FOR PROCESSING OPERATION 321, the focus optimized reconstruction of the source document is then provided to an OCR engine for processing.

In one embodiment, once the generated focus optimized reconstruction of the source document is provided to one or more data extraction engines, such as an OCR function, for identification and extraction of the data desired at PROVIDE THE FOCUS OPTIMIZED IMAGE OF THE SOURCE DOCUMENT TO A DATA EXTRACTION ENGINE FOR PROCESSING OPERATION 321, process flow proceeds to EXIT OPERATION 330.

In one embodiment, at EXIT OPERATION 330, process 300 for creating optimized images for data identification and extraction is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using the process 300 for creating optimized images for data identification and extraction discussed herein, focus optimized optical images of a source documents are accurately, efficiently, and reliably generated and provided for data extraction processing without requiring the transfer of multiple images of the source document or requiring significant user input or action.

In accordance with one embodiment, a system and method for creating optimized images for data identification and extraction includes generating a viewfinder screen display on a display screen of a display device. The viewfinder screen display is then positioned such that a source document is displayed in the viewfinder screen display.

In one embodiment, two or more source document image blocks corresponding to different portions and/or regions of the source document are defined. In one embodiment, for each source document image block the exposure of an image capture device is set to an optimized exposure setting for the source document image block.

In one embodiment, the image capture device then captures an image block optimized image of the source document optimized for the source document image block. In one embodiment, all of the image block optimized images of the source document are aggregated and for each image block optimized image of the source document, the image data representing the optimized source document image block in the image block optimized image of the source document is extracted.

In one embodiment, the extracted data representing the optimized image blocks of the source document are then aggregated and used to construct an exposure optimized image of the source document. The exposure optimized image of the source document is then provided to a data extraction engine for processing.

FIG. 6 is a flow chart depicting a process 600 for creating optimized images for data identification and extraction in accordance with one embodiment. Process 600 for creating optimized images for data identification and extraction begins at ENTER OPERATION 601 of FIG. 6 and process flow proceeds to GENERATE A VIEWFINDER SCREEN DISPLAY ON A DISPLAY SCREEN OF A DISPLAY DEVICE OF A COMPUTING SYSTEM OPERATION 603.

In one embodiment, GENERATE A VIEWFINDER SCREEN DISPLAY ON A DISPLAY SCREEN OF A DISPLAY DEVICE OF A COMPUTING SYSTEM OPERATION 603; POSITION THE VIEWFINDER SCREEN DISPLAY SUCH THAT A SOURCE DOCUMENT IS DISPLAYED IN THE VIEWFINDER SCREEN DISPLAY OPERATION 605; and DEFINE TWO OR MORE IMAGE BLOCKS OF THE SOURCE DOCUMENT CORRESPONDING TO DIFFERENT PORTIONS OF THE SOURCE DOCUMENT OPERATION 607, are substantially identical to GENERATE A VIEWFINDER SCREEN DISPLAY ON A DISPLAY SCREEN OF A DISPLAY DEVICE OF A COMPUTING SYSTEM OPERATION 303; POSITION THE VIEWFINDER SCREEN DISPLAY SUCH THAT A SOURCE DOCUMENT IS DISPLAYED IN THE VIEWFINDER SCREEN DISPLAY OPERATION 305; and DEFINE TWO OR MORE IMAGE BLOCKS OF THE SOURCE DOCUMENT CORRESPONDING TO DIFFERENT PORTIONS OF THE SOURCE DOCUMENT OPERATION 307 discussed above with respect to process 300 for creating optimized images for data identification and extraction.

Consequently, the reader to referred to the discussion above regarding GENERATE A VIEWFINDER SCREEN DISPLAY ON A DISPLAY SCREEN OF A DISPLAY DEVICE OF A COMPUTING SYSTEM OPERATION 303; POSITION THE VIEWFINDER SCREEN DISPLAY SUCH THAT A SOURCE DOCUMENT IS DISPLAYED IN THE VIEWFINDER SCREEN DISPLAY OPERATION 305; and DEFINE TWO OR MORE IMAGE BLOCKS OF THE SOURCE DOCUMENT CORRESPONDING TO DIFFERENT PORTIONS OF THE SOURCE DOCUMENT OPERATION 307 for a more detailed explanation of the operation of GENERATE A VIEWFINDER SCREEN DISPLAY ON A DISPLAY SCREEN OF A DISPLAY DEVICE OF A COMPUTING SYSTEM OPERATION 603; POSITION THE VIEWFINDER SCREEN DISPLAY SUCH THAT A SOURCE DOCUMENT IS DISPLAYED IN THE VIEWFINDER SCREEN DISPLAY OPERATION 605; and DEFINE TWO OR MORE IMAGE BLOCKS OF THE SOURCE DOCUMENT CORRESPONDING TO DIFFERENT PORTIONS OF THE SOURCE DOCUMENT OPERATION 607.

In one embodiment, once the image of the source document of DEFINE TWO OR MORE IMAGE BLOCKS OF THE SOURCE DOCUMENT CORRESPONDING TO DIFFERENT PORTIONS OF THE SOURCE DOCUMENT OPERATION 607, as displayed in the viewfinder screen display of GENERATE A VIEWFINDER SCREEN DISPLAY ON A DISPLAY SCREEN OF A DISPLAY DEVICE OF A COMPUTING SYSTEM OPERATION 603, is partitioned into two or more source document image blocks, or regions at DEFINE TWO OR MORE IMAGE BLOCKS OF THE SOURCE DOCUMENT CORRESPONDING TO DIFFERENT PORTIONS OF THE SOURCE DOCUMENT OPERATION 607, process flow proceeds to ASSIGN AN EXPOSURE ADJUSTMENT LOCATION TO EACH IMAGE BLOCK OF THE SOURCE DOCUMENT OPERATION 609.

In one embodiment, at ASSIGN AN EXPOSURE ADJUSTMENT LOCATION TO EACH IMAGE BLOCK OF THE SOURCE DOCUMENT OPERATION 609 for each defined source document image block of DEFINE TWO OR MORE IMAGE BLOCKS OF THE SOURCE DOCUMENT CORRESPONDING TO DIFFERENT PORTIONS OF THE SOURCE DOCUMENT OPERATION 607 an exposure adjustment location is defined that lies within the defined source document image block.

For instance, in one embodiment, at ASSIGN AN EXPOSURE ADJUSTMENT LOCATION TO EACH IMAGE BLOCK OF THE SOURCE DOCUMENT OPERATION 609 for each defined source document image block of DEFINE TWO OR MORE IMAGE BLOCKS OF THE SOURCE DOCUMENT CORRESPONDING TO DIFFERENT PORTIONS OF THE SOURCE DOCUMENT OPERATION 607 an exposure point is defined, such as the center of the respective source document image block.

In one embodiment, once a exposure adjustment location is defined for each defined source document image block of DEFINE TWO OR MORE IMAGE BLOCKS OF THE SOURCE DOCUMENT CORRESPONDING TO DIFFERENT PORTIONS OF THE SOURCE DOCUMENT OPERATION 607 at ASSIGN AN EXPOSURE ADJUSTMENT LOCATION TO EACH IMAGE BLOCK OF THE SOURCE DOCUMENT OPERATION 609, process flow proceeds to FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611.

In one embodiment, at FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611 for each exposure adjustment location, or source document image block, of ASSIGN AN EXPOSURE ADJUSTMENT LOCATION TO EACH IMAGE BLOCK OF THE SOURCE DOCUMENT OPERATION 609, an optimized exposure setting is determined and the exposure setting on, or for, the image capture device is set to the optimized exposure setting for that exposure adjustment location, or source document image block, and an image block optimized image of the source document is captured with the exposure set to this optimized exposure setting.

In one embodiment, at FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611 for each exposure adjustment location, or source document image block, of ASSIGN AN EXPOSURE ADJUSTMENT LOCATION TO EACH IMAGE BLOCK OF THE SOURCE DOCUMENT OPERATION 609, an optimized exposure setting is determined.

In one embodiment, at FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611 for each exposure adjustment location, the exposure setting on, or for, the image capture device, such as a camera function, is set to the optimized exposure setting for that exposure adjustment location, or source document image block.

In one embodiment, at FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611 an image block optimized image of the source document is then captured with the exposure set to the optimized exposure setting.

In one embodiment, at FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611 this process is repeated for each exposure adjustment location, and, therefore, for each defined source document image block of DEFINE TWO OR MORE IMAGE BLOCKS OF THE SOURCE DOCUMENT CORRESPONDING TO DIFFERENT PORTIONS OF THE SOURCE DOCUMENT OPERATION 607.

In one embodiment, once for each exposure adjustment location, or source document image block, of ASSIGN AN EXPOSURE ADJUSTMENT LOCATION TO EACH IMAGE BLOCK OF THE SOURCE DOCUMENT OPERATION 609, an optimized exposure setting is determined and the exposure setting on, or for, the image capture device is set to the optimized exposure setting for that exposure adjustment location, or source document image block, and an image block optimized image of the source document is captured with the exposure set to this optimized exposure setting at FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611, process flow proceeds to AGGREGATE ALL OF THE IMAGE BLOCK OPTIMIZED IMAGES OF THE SOURCE DOCUMENT OPERATION 613.

In one embodiment, at AGGREGATE ALL OF THE IMAGE BLOCK OPTIMIZED IMAGES OF THE SOURCE DOCUMENT OPERATION 613, the image block optimized images of the source document of FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611 are correlated and aggregated into a set of image block optimized images of the source document.

As a result of the processing at FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611, an image block optimized image of the source document is obtained for each defined source document image block. Consequently, a set of image block optimized images of the source document is created with each image block optimized image of the source document having been captured with the image capture device exposure setting set to the optimized exposure setting for the respective source document image block.

In one embodiment, each of the image block optimized images of the source document is correlated to its respective source document image block.

In one embodiment, each of the image block optimized images of the source document is provided metadata to indicate which source document image block is optimized in the image block optimized source document image, the exposure setting used to obtain the image block optimized image, and/or any other data associated with the individual image block optimized images of the source document desired.

In one embodiment, at AGGREGATE ALL OF THE IMAGE BLOCK OPTIMIZED IMAGES OF THE SOURCE DOCUMENT OPERATION 613, the related correlated, or tagged, image block optimized images of the source document are aggregated into a set of image block optimized images of the source document.

In one embodiment, once the image block optimized images of the source document of FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611 are correlated and aggregated into a set of image block optimized images of the source document at AGGREGATE ALL OF THE IMAGE BLOCK OPTIMIZED IMAGES OF THE SOURCE DOCUMENT OPERATION 613, process flow proceeds to EXTRACT IMAGE DATA REPRESENTING THE OPTIMIZED IMAGE BLOCKS OF THE SOURCE DOCUMENT ASSOCIATED WITH EACH OF THE EXPOSURE ADJUSTMENT LOCATIONS OPERATION 615.

In one embodiment, at EXTRACT IMAGE DATA REPRESENTING THE OPTIMIZED IMAGE BLOCKS OF THE SOURCE DOCUMENT ASSOCIATED WITH EACH OF THE EXPOSURE ADJUSTMENT LOCATIONS OPERATION 615 each image block optimized image of the source document of AGGREGATE ALL OF THE IMAGE BLOCK OPTIMIZED IMAGES OF THE SOURCE DOCUMENT OPERATION 613 is processed such that image data within the image block optimized image of the source document corresponding to the source document image block optimized in that image block optimized image of the source document is extracted, or cropped, to create extracted image data representing the optimized source document image block in the image block optimized image of the source document.

In one embodiment, this process is repeated for each image block optimized image of the source document included in the set of image block optimized document images of the source document. Consequently, at EXTRACT IMAGE DATA REPRESENTING THE OPTIMIZED IMAGE BLOCKS OF THE SOURCE DOCUMENT ASSOCIATED WITH EACH OF THE EXPOSURE ADJUSTMENT LOCATIONS OPERATION 615 extracted image data representing the set of optimized source document image blocks from each of the image block optimized document images of the source document is generated.

In one embodiment, once each image block optimized image of the source document of AGGREGATE ALL OF THE IMAGE BLOCK OPTIMIZED IMAGES OF THE SOURCE DOCUMENT OPERATION 613 is processed such that image data within the image block optimized image of the source document corresponding to the source document optimized in that image block optimized image of the source document is extracted, or cropped, to create extracted image data representing the optimized source document image block optimized in the image block optimized image of the source document at EXTRACT IMAGE DATA REPRESENTING THE OPTIMIZED IMAGE BLOCKS OF THE SOURCE DOCUMENT ASSOCIATED WITH EACH OF THE EXPOSURE ADJUSTMENT LOCATIONS OPERATION 615, process flow proceeds to AGGREGATE THE EXTRACTED IMAGE DATA REPRESENTING THE OPTIMIZED IMAGE BLOCKS OF THE SOURCE DOCUMENT OPERATION 617.

In one embodiment, at AGGREGATE THE EXTRACTED IMAGE DATA REPRESENTING THE OPTIMIZED IMAGE BLOCKS OF THE SOURCE DOCUMENT OPERATION 617 all the extracted image data representing the set of optimized source document image blocks from each of the image block optimized document images of the source document of EXTRACT IMAGE DATA REPRESENTING THE OPTIMIZED IMAGE BLOCKS OF THE SOURCE DOCUMENT ASSOCIATED WITH EACH OF THE EXPOSURE ADJUSTMENT LOCATIONS OPERATION 615 are aggregated into a set of extracted image data representing the set of optimized source document image blocks.

As a result of the processing at EXTRACT IMAGE DATA REPRESENTING THE OPTIMIZED IMAGE BLOCKS OF THE SOURCE DOCUMENT ASSOCIATED WITH EACH OF THE EXPOSURE ADJUSTMENT LOCATIONS OPERATION 615, extracted image data representing optimized source document image blocks from each of the image block optimized document images of the source document is generated. In one embodiment, at AGGREGATE THE EXTRACTED IMAGE DATA REPRESENTING THE OPTIMIZED IMAGE BLOCKS OF THE SOURCE DOCUMENT OPERATION 617 all the extracted image data representing the set of optimized source document image blocks associated with the source document are aggregated to generate a set of extracted image data representing the set of optimized source document image blocks from each of the image block optimized document images of the source document.

In one embodiment, once all the extracted image data representing the set of optimized source document image blocks from each of the image block optimized document images of the source document of EXTRACT IMAGE DATA REPRESENTING THE OPTIMIZED IMAGE BLOCKS OF THE SOURCE DOCUMENT ASSOCIATED WITH EACH OF THE EXPOSURE ADJUSTMENT LOCATIONS OPERATION 615 are aggregated into a set of extracted image data representing the set of optimized source document image blocks at AGGREGATE THE EXTRACTED IMAGE DATA REPRESENTING THE OPTIMIZED IMAGE BLOCKS OF THE SOURCE DOCUMENT OPERATION 617, process flow proceeds to USE THE EXTRACTED IMAGE DATA REPRESENTING THE OPTIMIZED IMAGE BLOCKS OF THE SOURCE DOCUMENT TO GENERATE AN EXPOSURE OPTIMIZED IMAGE OF THE SOURCE DOCUMENT OPERATION 619.

In one embodiment, at USE THE EXTRACTED IMAGE DATA REPRESENTING THE OPTIMIZED IMAGE BLOCKS OF THE SOURCE DOCUMENT TO GENERATE AN EXPOSURE OPTIMIZED IMAGE OF THE SOURCE DOCUMENT OPERATION 619 the set of extracted image data representing the set of optimized source document image blocks of AGGREGATE THE EXTRACTED IMAGE DATA REPRESENTING THE OPTIMIZED IMAGE BLOCKS OF THE SOURCE DOCU- MENT OPERATION 617 is used to generate an exposure optimized reconstruction of the source document such that each exposure optimized reconstruction of the source document image block is the optimized source document image block obtained from the image block optimized source document image of the source document captured with the exposure setting on the image capture device optimized for that source document image block.

In one embodiment, if post-image capture processing is required, such as brightness, contrast, color, image enhancement, and/or any other post-image capture adjustments, this processing is performed on each of the optimized source document image blocks individually. Consequently, the processing power required to perform the post-image capture processing can be minimized as the processing is localized to the individual optimized source document image blocks that actually require this processing.

In one embodiment, once the set of extracted image data representing the set of optimized source document image blocks of AGGREGATE THE EXTRACTED IMAGE DATA REPRESENTING THE OPTIMIZED IMAGE BLOCKS OF THE SOURCE DOCUMENT OPERATION 617 is used to generate an exposure optimized reconstruction of the source document at USE THE EXTRACTED IMAGE DATA REPRESENTING THE OPTIMIZED IMAGE BLOCKS OF THE SOURCE DOCUMENT TO GENERATE AN EXPOSURE OPTIMIZED IMAGE OF THE SOURCE DOCUMENT OPERATION 619, process flow proceeds to PROVIDE THE EXPOSURE OPTIMIZED IMAGE OF THE SOURCE DOCUMENT TO A DATA EXTRACTION ENGINE FOR PROCESSING OPERATION 621.

In one embodiment, at PROVIDE THE EXPOSURE OPTIMIZED IMAGE OF THE SOURCE DOCUMENT TO A DATA EXTRACTION ENGINE FOR PROCESSING OPERATION 621 the generated exposure optimized reconstruction of the source document is provided to one or more data extraction engines, such as an OCR function, for identification and extraction of the data desired.

As a specific illustrative example of the operation of one embodiment of process 600 for creating optimized images for data identification and extraction, assume a source document is partitioned into four source document image blocks at DEFINE TWO OR MORE IMAGE BLOCKS OF THE SOURCE DOCUMENT CORRESPONDING TO DIFFERENT PORTIONS OF THE SOURCE DOCUMENT OPERATION 607, e.g., quadrant one source document image block, quadrant two source document image block, quadrant three source document image block, and quadrant four source document image block. In this specific example, assume the image capture parameter is the exposure setting for a camera function implemented on a smart phone.

In this specific example, it is stipulated that the adjustment location, i.e., the exposure setting location, for each of the four source document image blocks is defined at ASSIGN AN EXPOSURE ADJUSTMENT LOCATION TO EACH IMAGE BLOCK OF THE SOURCE DOCUMENT OPERATION 609 to be the center of the respective source document image blocks. It is further stipulated, that in this specific example, the optimized exposure setting of FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611 for quadrant one source document image block is "0.01", the optimized exposure setting for quadrant two source document image block is "0.02", the optimized exposure setting for quadrant three source document image block is "0.03", and the optimized exposure setting for quadrant four source document image block is "0.04".

In this specific example, four images of the source document would be captured at FOR EACH EXPOSURE ADJUSTMENT LOCATION ADJUST THE EXPOSURE SETTING OF AN IMAGE CAPTURE DEVICE TO AN OPTIMIZED EXPOSURE SETTING FOR THE EXPOSURE ADJUSTMENT LOCATION AND CAPTURE AN IMAGE BLOCK OPTIMIZED IMAGE OF THE SOURCE DOCUMENT OPERATION 611: one with the camera's exposure setting set to "0.01", to create a quadrant one image block optimized source document image; one with the camera's exposure setting set to "0.02", to create a quadrant two image block optimized source document image; one with the camera's exposure setting set to "0.03" to create a quadrant three image block optimized source document image; and one with the camera's exposure setting set to "0.04" to create a quadrant four image block optimized source document image.

In this specific example, each of the four image block optimized source document images is correlated to its respective source document image block, or tagged with desired metadata to indicate its respective source document image block, the exposure setting, and any other information desired at AGGREGATE ALL OF THE IMAGE BLOCK OPTIMIZED IMAGES OF THE SOURCE DOCUMENT OPERATION 613.

The set of extracted image data representing the set of optimized source document image blocks is then aggregated at AGGREGATE ALL OF THE IMAGE BLOCK OPTIMIZED IMAGES OF THE SOURCE DOCUMENT OPERATION 613, e.g., in this example, quadrant one image block optimized source document image, quadrant two image block optimized source document image, quadrant three image block optimized source document image, quadrant four image block optimized source document image are aggregated.

Each image block optimized image of the source document is then processed at EXTRACT IMAGE DATA REPRESENTING THE OPTIMIZED IMAGE BLOCKS OF THE SOURCE DOCUMENT ASSOCIATED WITH EACH OF THE EXPOSURE ADJUSTMENT LOCATIONS OPERATION 615 such that image data within the image block optimized image of the source document corresponding to the source document image block optimized in that image block optimized image of the source document is extracted, or cropped, to create extracted image data at EXTRACT IMAGE DATA REPRESENTING THE OPTIMIZED IMAGE BLOCKS OF THE SOURCE DOCUMENT ASSOCIATED WITH EACH OF THE EXPOSURE ADJUSTMENT LOCATIONS OPERATION 615 representing the optimized source document image block optimized in the image block optimized image of the source document.

In this specific example, the image data within quadrant one image block optimized source document image representing the quadrant one optimized source document image block is extracted; the image data within quadrant two image block optimized source document image representing the quadrant two optimized source document image block is extracted; the image data within quadrant three image block optimized source document image representing the quadrant three optimized source document image block is extracted; and the image data within quadrant four image block optimized source document image representing the quadrant four optimized source document image block is extracted, to obtain optimized quadrant one, optimized quadrant two, optimized quadrant three, and optimized quadrant four source document image blocks.

In this specific example, optimized quadrant one, optimized quadrant two, optimized quadrant three, and optimized quadrant four source document image blocks are aggregated at AGGREGATE THE EXTRACTED IMAGE DATA REPRESENTING THE OPTIMIZED IMAGE BLOCKS OF THE SOURCE DOCUMENT OPERATION 617 and then used at USE THE EXTRACTED IMAGE DATA REPRESENTING THE OPTIMIZED IMAGE BLOCKS OF THE SOURCE DOCUMENT TO GENERATE AN EXPOSURE OPTIMIZED IMAGE OF THE SOURCE DOCUMENT OPERATION 619 to generate an exposure optimized reconstruction of the source document where each exposure optimized reconstruction of the source document image block is the optimized source document image block obtained from the image block optimized source document image of the source document captured with the exposure setting on the image capture device optimized for that source document image block.

In this specific illustrative example, at PROVIDE THE EXPOSURE OPTIMIZED IMAGE OF THE SOURCE DOCUMENT TO A DATA EXTRACTION ENGINE FOR PROCESSING 621 the exposure optimized reconstruction of the source document is then provided to an OCR engine for processing.

In one embodiment, once the generated exposure optimized reconstruction of the source document is provided to one or more data extraction engines, such as an OCR function, for identification and extraction of the data desired at PROVIDE THE EXPOSURE OPTIMIZED IMAGE OF THE SOURCE DOCUMENT TO A DATA EXTRACTION ENGINE FOR PROCESSING OPERATION 621, process flow proceeds to EXIT OPERATION 630.

In one embodiment, at EXIT OPERATION 630, process 600 for creating optimized images for data identification and extraction is exited to await new data.

It is worth noting that while process 300 for creating optimized images for data identification and extraction is described as being directed to embodiments where the optimized image capture parameter is the focus setting, and process 600 for creating optimized images for data identification and extraction is described as being directed to embodiments where the optimized image capture parameter is the exposure setting, in various embodiments, the focus setting, the exposure setting, and/or both the focus setting and exposure setting, are selectively and alternatively optimized for individual source document images blocks or sets of source document images blocks.

For instance, as a specific illustrative example, in one embodiment, a given source document image block, or subset of source document image blocks, of the given source document is optimized for the focus setting while another source document image block, or sub-set of source document image blocks, of the same given source document is optimized for the exposure setting.

As an even more specific illustrative example, assume the bottom left region of a source document is known to have mostly text-related source data, while the upper right region of the same source document is known to have visual image-related source data, such as a company logo, or a picture.

In this specific illustrative example, the source document image block, or blocks, assigned to the bottom left region of the source document are optimized for the focus setting, while the source document image block, or blocks, assigned to the upper right region of the source document are optimized for the exposure setting. In addition the source document image block, or blocks, assigned to the other regions of the source document may be optimized for both the focus setting and exposure setting, or may not be optimized at all.

Consequently, in various embodiments, the processes described with respect to process 300 for creating optimized images for data identification and extraction and process 600 for creating optimized images for data identification and extraction can be combined for processing a single source document, and to generate a single image capture parameter optimized image of the source document. This provides significant flexibility to the user.

Using process 600 for creating optimized images for data identification and extraction discussed herein, exposure optimized optical images of a source documents are accurately, efficiently, and reliably generated and provided for data extraction processing without requiring the transfer of multiple images of the source document or requiring significant user input or action.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for creating optimized images for data identification and extraction comprising the following, which when executed individually or collectively by any set of one or more processors perform a process including:
    generating a viewfinder screen display on a display screen of a display device;
    positioning the viewfinder screen display such that a source document is displayed in the viewfinder screen display;
    defining two or more image blocks of the source document corresponding to different portions of the source document;
    for each image block of the source document, adjusting a focus setting of an image capture device to an optimized focus setting for the image block of the source document and causing the image capture device to capture an image block optimized image of the source document optimized for the image block of the source document;
    aggregating all of the image block optimized images of the source document;
    for each image block optimized image of the source document extracting data representing the optimized source document image block;
    aggregating the extracted data representing the optimized image blocks of the source document from each of the image block optimized images of the source document;
    using the aggregated extracted data representing the optimized image blocks of the source document to generate a focus optimized image of the source document; and
    providing the focus optimized image of the source document to a data extraction engine for processing.

2. The computing system implemented method for creating optimized images for data identification and extraction of claim 1 wherein the computing system is a mobile computing system and the image capture device is a mobile camera.

3. The computing system implemented method for creating optimized images for data identification and extraction of claim 1 wherein the computing system is a mobile phone and the image capture device is a mobile camera.

4. The computing system implemented method for creating optimized images for data identification and extraction of claim 1 wherein the source document is selected from the group of source documents consisting of:
    a hardcopy of a receipt;
    a hardcopy of an invoice;
    a hardcopy of any financial transaction related document;
    a hardcopy of a tax related document;
    a hardcopy of a warranty; or
    a hardcopy of any document.

5. The computing system implemented method for creating optimized images for data identification and extraction of claim 1 wherein the number of image blocks of the source document corresponding to different portions of the source document is determined based on the resolution of image capture device.

6. The computing system implemented method for creating optimized images for data identification and extraction of claim 1 wherein the location of the image blocks of the source document are determined based on the type of source document.

7. The computing system implemented method for creating optimized images for data identification and extraction of claim 1 wherein the number of image blocks of the source document corresponding to different portions of the source document is 9 or 16.

8. The computing system implemented method for creating optimized images for data identification and extraction of claim 1 wherein the two or more source document image blocks corresponding to different portions of the source document are defined by defining two or more portions of the viewfinder screen display, the two or more portions of the viewfinder screen display corresponding to portions of the source document such that the image of the source document in the viewfinder screen display is divided into image blocks corresponding to the defined portions of the viewfinder screen display.

9. The computing system implemented method for creating optimized images for data identification and extraction of claim 1 wherein each image block optimized image of the source document is assigned metadata identifying the source document image block optimized.

10. The computing system implemented method for creating optimized images for data identification and extraction of claim 1 wherein each image block optimized image of the source document is assigned metadata identifying the source document image block optimized and the size of the source document image block optimized.

11. The computing system implemented method for creating optimized images for data identification and extraction of claim 1 wherein each image block optimized image of the source document is assigned metadata identifying the optimized focus setting for image block optimized image.

12. The computing system implemented method for creating optimized images for data identification and extraction of claim 1 wherein each image block optimized image of the source document is assigned metadata identifying the type of data in the source document image block optimized.

13. The computing system implemented method for creating optimized images for data identification and extraction of claim 1 wherein a determination of whether to perform post image capture processing, or what post image capture processing, is made for each source document image block individually.

14. A computing system implemented method for creating optimized images for data identification and extraction comprising the following, which when executed individually or collectively by any set of one or more processors perform a process including:
   generating a viewfinder screen display on a display screen of a display device;
   positioning the viewfinder screen display such that a source document is displayed in the viewfinder screen display;
   defining two or more image blocks of the source document corresponding to different portions of the source document;
   for each image block of the source document, adjusting an exposure setting of an image capture device to an optimized exposure setting for the image block of the source document and causing the image capture device to capture an image block optimized image of the source document optimized for the image block of the source document;
   aggregating all of the image block optimized images of the source document;
   for each image block optimized image of the source document extracting data representing the optimized source document image block;
   aggregating the extracted data representing the optimized image blocks of the source document from each of the image block optimized images of the source document;
   using the aggregated extracted data representing the optimized image blocks of the source document to generate a exposure optimized image of the source document; and
   providing the exposure optimized image of the source document to a data extraction engine for processing.

15. The computing system implemented method for creating optimized images for data identification and extraction of claim 14 wherein the computing system is a mobile computing system and the image capture device is a mobile camera.

16. The computing system implemented method for creating optimized images for data identification and extraction of claim 14 wherein the computing system is a mobile phone and the image capture device is a mobile camera.

17. The computing system implemented method for creating optimized images for data identification and extraction of claim 14 wherein the source document is selected from the group of source documents consisting of:
   a hardcopy of a receipt;
   a hardcopy of an invoice;
   a hardcopy of any financial transaction related document;
   a hardcopy of a tax related document;
   a hardcopy of a warranty; or
   a hardcopy of any document.

18. The computing system implemented method for creating optimized images for data identification and extraction of claim 14 wherein the number of image blocks of the source document corresponding to different portions of the source document is determined based on the resolution of image capture device.

19. The computing system implemented method for creating optimized images for data identification and extraction of claim 14 wherein the location of the image blocks of the source document are determined based on the type of source document.

20. The computing system implemented method for creating optimized images for data identification and extraction of claim 14 wherein the number of image blocks of the source document corresponding to different portions of the source document is 9 or 16.

21. The computing system implemented method for creating optimized images for data identification and extraction of claim 14 wherein the two or more source document image blocks corresponding to different portions of the source document are defined by defining two or more portions of the viewfinder screen display, the two or more portions of the viewfinder screen display corresponding to portions of the source document such that the image of the source document in the viewfinder screen display is divided into image blocks corresponding to the defined portions of the viewfinder screen display.

22. The computing system implemented method for creating optimized images for data identification and extraction of claim 14 wherein each image block optimized image of the source document is assigned metadata identifying the source document image block optimized.

23. The computing system implemented method for creating optimized images for data identification and extraction of claim 14 wherein each image block optimized image of the source document is assigned metadata identifying the source document image block optimized and the size of the source document image block optimized.

24. The computing system implemented method for creating optimized images for data identification and extraction of claim 14 wherein each image block optimized image of the source document is assigned metadata identifying the optimized exposure setting for image block optimized image.

25. The computing system implemented method for creating optimized images for data identification and extraction of claim 14 wherein each image block optimized image of the source document is assigned metadata identifying the type of data in the source document image block optimized.

26. The computing system implemented method for creating optimized images for data identification and extraction of claim 14 wherein a determination of whether to perform post image capture processing, or what post image capture processing, is made for each source document image block individually.

27. A computing system implemented method for creating optimized images for data identification and extraction comprising the following, which when executed individually or collectively by any set of one or more processors perform a process including:
- generating a viewfinder screen display on a display screen of a display device;
- positioning the viewfinder screen display such that a source document is displayed in the viewfinder screen display;
- defining two or more image blocks of the source document corresponding to different portions of the source document;
- for each image block of the source document, adjusting an image capture parameter setting of an image capture device to an optimized image capture parameter setting for the image block of the source document and causing the image capture device to capture an image block optimized image of the source document optimized for the image block of the source document;
- aggregating all of the image block optimized images of the source document;
- for each image block optimized image of the source document extracting data representing the optimized source document image block;
- aggregating the extracted data representing the optimized image blocks of the source document from each of the image block optimized images of the source document;
- using the aggregated extracted data representing the optimized image blocks of the source document to generate an image capture parameter optimized image of the source document; and
- providing the image capture parameter optimized image of the source document to a data extraction engine for processing.

28. The computing system implemented method for creating optimized images for data identification and extraction of claim 27 wherein the computing system is a mobile computing system and the image capture device is a mobile camera.

29. The computing system implemented method for creating optimized images for data identification and extraction of claim 27 wherein the computing system is a mobile phone and the image capture device is a mobile camera.

30. The computing system implemented method for creating optimized images for data identification and extraction of claim 27 wherein the source document is selected from the group of source documents consisting of:
- a hardcopy of a receipt;
- a hardcopy of an invoice;
- a hardcopy of any financial transaction related document;
- a hardcopy of a tax related document;
- a hardcopy of a warranty; or
- a hardcopy of any document.

31. The computing system implemented method for creating optimized images for data identification and extraction of claim 27 wherein the number of image blocks of the source document corresponding to different portions of the source document is determined based on the resolution of image capture device.

32. The computing system implemented method for creating optimized images for data identification and extraction of claim 27 wherein the location of the image blocks of the source document are determined based on the type of source document.

33. The computing system implemented method for creating optimized images for data identification and extraction of claim 27 wherein the number of image blocks of the source document corresponding to different portions of the source document is 9 or 16.

34. The computing system implemented method for creating optimized images for data identification and extraction of claim 27 wherein the two or more source document image blocks corresponding to different portions of the source document are defined by defining two or more portions of the viewfinder screen display, the two or more portions of the viewfinder screen display corresponding to portions of the source document such that the image of the source document in the viewfinder screen display is divided into image blocks corresponding to the defined portions of the viewfinder screen display.

35. The computing system implemented method for creating optimized images for data identification and extraction of claim 27 wherein each image block optimized image of the source document is assigned metadata identifying the source document image block optimized.

36. The computing system implemented method for creating optimized images for data identification and extraction of claim 27 wherein each image block optimized image of the source document is assigned metadata identifying the source document image block optimized and the size of the source document image block optimized.

37. The computing system implemented method for creating optimized images for data identification and extraction of claim 27 wherein each image block optimized image of the source document is assigned metadata identifying the optimized image capture parameter setting for image block optimized image.

38. The computing system implemented method for creating optimized images for data identification and extraction of claim 27 wherein each image block optimized image of the source document is assigned metadata identifying the type of data in the source document image block optimized.

39. The computing system implemented method for creating optimized images for data identification and extraction of claim 27 wherein a determination of whether to perform post image capture processing, or what post image capture processing, is made for each source document image block individually.

40. A system for creating optimized images for data identification and extraction comprising:
- at least one processor; and
- at least one memory coupled to the at least one processor, the at least one memory having stored therein instructions which when executed by any set of the one or more processors, perform a process for creating optimized images for data identification and extraction, the process for creating optimized images for data identification and extraction including:

generating a viewfinder screen display on a display screen of a display device;

positioning the viewfinder screen display such that a source document is displayed in the viewfinder screen display;

defining two or more image blocks of the source document corresponding to different portions of the source document;

for each image block of the source document, adjusting an image capture parameter setting of an image capture device to an optimized image capture parameter setting for the image block of the source document and causing the image capture device to capture an image block optimized image of the source document optimized for the image block of the source document;

aggregating all of the image block optimized images of the source document;

for each image block optimized image of the source document extracting data representing the optimized source document image block;

aggregating the extracted data representing the optimized image blocks of the source document from each of the image block optimized images of the source document;

using the aggregated extracted data representing the optimized image blocks of the source document to generate an image capture parameter optimized image of the source document; and providing the image capture parameter optimized image of the source document to a data extraction engine for processing.

41. The system for creating optimized images for data identification and extraction of claim 40 wherein the computing system is a mobile computing system and the image capture device is a mobile camera.

42. The system for creating optimized images for data identification and extraction of claim 40 wherein the computing system is a mobile phone and the image capture device is a mobile camera.

43. The system for creating optimized images for data identification and extraction of claim 40 wherein the source document is selected from the group of source documents consisting of:

a hardcopy of a receipt;
a hardcopy of an invoice;
a hardcopy of any financial transaction related document;
a hardcopy of a tax related document;
a hardcopy of a warranty; or
a hardcopy of any document.

44. The system for creating optimized images for data identification and extraction of claim 40 wherein the number of image blocks of the source document corresponding to different portions of the source document is determined based on the resolution of image capture device.

45. The system for creating optimized images for data identification and extraction of claim 40 wherein the location of the image blocks of the source document are determined based on the type of source document.

46. The system for creating optimized images for data identification and extraction of claim 40 wherein the number of image blocks of the source document corresponding to different portions of the source document is 9 or 16.

47. The system for creating optimized images for data identification and extraction of claim 40 wherein the two or more source document image blocks corresponding to different portions of the source document are defined by defining two or more portions of the viewfinder screen display, the two or more portions of the viewfinder screen display corresponding to portions of the source document such that the image of the source document in the viewfinder screen display is divided into image blocks corresponding to the defined portions of the viewfinder screen display.

48. The system for creating optimized images for data identification and extraction of claim 40 wherein each image block optimized image of the source document is assigned metadata identifying the source document image block optimized.

49. The system for creating optimized images for data identification and extraction of claim 40 wherein each image block optimized image of the source document is assigned metadata identifying the source document image block optimized and the size of the source document image block optimized.

50. The system for creating optimized images for data identification and extraction of claim 40 wherein each image block optimized image of the source document is assigned metadata identifying the optimized image capture parameter setting for image block optimized image.

51. The system for creating optimized images for data identification and extraction of claim 40 wherein each image block optimized image of the source document is assigned metadata identifying the type of data in the source document image block optimized.

52. The system for creating optimized images for data identification and extraction of claim 40 wherein a determination of whether to perform post image capture processing, or what post image capture processing, is made for each source document image block individually.

* * * * *